US012649834B2

(12) United States Patent
Chaeichian et al.

(10) Patent No.: US 12,649,834 B2
(45) Date of Patent: Jun. 9, 2026

(54) THERMOPLASTIC SURFACES COMPRISING DIRECT BONDED CHEMICAL SEALANTS

(71) Applicant: Henkel AG & Co. KGaA, Duesseldorf (DE)

(72) Inventors: Sina Chaeichian, Walnut Creek, CA (US); Kaspar Schaerer, Walnut Creek, CA (US); Bashir M. Ahmed, Rochester, MI (US); Omar L. Abu-Shanab, Rochester Hills, MI (US); Michael D. Halbasch, Antioch, CA (US); Tsehaye N. Eyassu, Madison Heights, MI (US); Martin Renkel, Duesseldorf (DE); Ruairi O'Kane, Oakland, CA (US); Anna Esmeralda Javier, Eden Prairie, MN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/453,539

(22) Filed: Nov. 4, 2021

(65) Prior Publication Data

US 2022/0056227 A1 Feb. 24, 2022

Related U.S. Application Data

(63) Continuation of application No. PCT/US2020/070020, filed on May 4, 2020.

(Continued)

(51) Int. Cl.

*C08J 7/04* (2020.01)
*B05D 3/06* (2006.01)

(Continued)

(52) U.S. Cl.

CPC .............. *C08J 7/042* (2013.01); *B05D 3/063* (2013.01); *C08J 7/043* (2020.01); *C08J 7/18* (2013.01);

(Continued)

(58) Field of Classification Search

CPC ..... C08J 7/042; C08J 7/043; C08J 7/18; C08J 2371/00; C08J 2463/00; C08J 7/12;

(Continued)

(56) References Cited

U.S. PATENT DOCUMENTS

| | | |
|---|---|---|
| 3,655,423 A | 4/1972 | Lin et al. |
| 6,194,061 B1 | 2/2001 | Satoh et al. |

(Continued)

FOREIGN PATENT DOCUMENTS

| | | |
|---|---|---|
| CN | 1265698 A | 9/2000 |
| CN | 111492026 A | 8/2020 |

(Continued)

OTHER PUBLICATIONS

"Designation: D3359-09 Standard Test Methods for Measuring Adhesion by Tape Test" by ASTM. (Year: 2023).*

(Continued)

*Primary Examiner* — Christina H.W. Rosebach

(74) *Attorney, Agent, or Firm* — Mary K. Cameron

(57) ABSTRACT

This disclosure is directed to methods for preparing thermoplastic surfaces suitable for the application of paint, adhesives, or surfacing films and the structures derived or derivable from these methods. The disclosure is also directed to composite structures comprising a thermoplastic substrate comprising a chemical sealant direct bonded to a surface thereof, the chemical sealant providing a surface suitable for adhering adhesives, paints, and/or surfacing films to the thermoplastic surfaces.

23 Claims, 1 Drawing Sheet

Related U.S. Application Data

(60) Provisional application No. 62/846,350, filed on May 10, 2019.

(51) Int. Cl.
*C08J 7/043* (2020.01)
*C08J 7/18* (2006.01)
*C09J 5/02* (2006.01)
*B32B 5/12* (2006.01)

(52) U.S. Cl.
CPC .................. *C09J 5/02* (2013.01); *B32B 5/12* (2013.01); *C08J 2371/00* (2013.01); *C08J 2463/00* (2013.01)

(58) Field of Classification Search
CPC ........ C08J 7/123; C08J 7/0423; C08J 7/0427; C08J 2371/12; C08J 2381/06; C08J 2365/02; C08J 2379/08; B32B 5/12; B05D 3/063; B05D 3/067; C09J 5/02; B29C 59/16; C08G 2650/40; C08K 5/56; C08L 71/00; C08L 71/02; C08L 71/12; C08L 81/02; C09D 163/00
See application file for complete search history.

(56) References Cited

U.S. PATENT DOCUMENTS

| | | | |
|---|---|---|---|
| 2003/0159915 A1 | 8/2003 | Jing et al. | |
| 2009/0104410 A1 | 4/2009 | Siegel et al. | |
| 2009/0227755 A1 | 9/2009 | Devoe et al. | |
| 2010/0112518 A1* | 5/2010 | Engelbrecht | A61K 6/77 428/688 |
| 2014/0162020 A1* | 6/2014 | Wang | B32B 27/281 428/113 |
| 2014/0220356 A1 | 8/2014 | Van | |
| 2014/0234579 A1 | 8/2014 | Wang et al. | |
| 2018/0037703 A1 | 2/2018 | Richardson et al. | |
| 2020/0239655 A1* | 7/2020 | Deegan | B29C 59/16 |
| 2021/0198535 A1* | 7/2021 | Hebert | C09J 7/50 |

FOREIGN PATENT DOCUMENTS

| | | | | |
|---|---|---|---|---|
| FR | 3026982 A1 | | 4/2016 | |
| GB | 2321025 A | * | 7/1998 | B05D 3/06 |
| JP | H05132569 A | | 5/1993 | |
| JP | H093221 A | | 1/1997 | |
| JP | H11334011 A | | 12/1999 | |
| JP | 2000226536 A | | 8/2000 | |
| JP | 2000267487 A | | 9/2000 | |
| JP | 2005212107 A | | 8/2005 | |
| JP | 2006016685 A | | 1/2006 | |
| JP | 2006203114 A | | 8/2006 | |
| JP | 2014093176 A | | 5/2014 | |
| JP | 2015034285 A | | 2/2015 | |
| JP | 2017210621 A | | 11/2017 | |
| JP | 6270028 B2 | | 1/2018 | |
| JP | 2019001151 A | | 1/2019 | |
| WO | WO-2016097654 A1 | * | 6/2016 | B05B 13/02 |
| WO | 2017110991 A1 | | 6/2017 | |
| WO | 2017154718 A1 | | 9/2017 | |
| WO | 2017170445 A1 | | 10/2017 | |
| WO | WO-2018228893 A1 | * | 12/2018 | B29C 59/16 |
| WO | 2019123393 A1 | | 6/2019 | |
| WO | 2020228893 A1 | | 11/2020 | |

OTHER PUBLICATIONS

"Clearfil Ceramic Primer" by Kuraray (Year: 2008).*

Kern, M. et al. Influence of surface conditioning on bonding to polyetheretherketon (PEEK). Dental Materials 28 pp. 1280-1283. (Year: 2012).*

"Luxatemp Fluorescence" by The Dental Advisor. Accessed 2023. (Year: 2023).*

Giancaterina, S. et al. Photochemical evolution of poly(ether ether ketone). Polymer Degradation and Stability 68 (2000) 133-144. (Year: 2000).*

Pham, H.Q. and Marks, M.J. (2005). Epoxy Resins. In Ullmann's Encyclopedia of Industrial Chemistry, (Ed.). https://doi.org/10.1002/14356007.a09_547.pub2 (Year: 2005).*

Pape, P. "Adhesion Promoters: Silane Coupling Agents" in Applied Plastics Engineering Handbook—Processing and Materials. Ed: Kutz, Myer. Elsevier. (2011). Retrieved from https://app.knovel.com/hotlink/toc/id:kpAPEHPMOD/applied-plastics-engineering/applied-plastics-engineering (Year: 2011).*

Chapter 1—Utlraviolet Light. In "Ultraviolet Laser Technology and Applications" Academic Press, 1995 pp. 1-32. Ed: David J. Elliott ISBN 9780122370700. (Year: 1995).*

Machine Translation of WO-2016097654-A1. (Year: 2016).*

Henkel Corp. Surfacing Films Improve Safety, Appearance and Processing Time. Ed. by CompositesWorld. Published May 1, 2018. Available at https://www.compositesworld.com/articles/surfacing-films-improve-safety-appearance-and-processing-time (Year: 2018).*

International Search Report for PCT/US2020/070020 mailed Aug. 24, 2020.

International Search Report for PCT/US2020/070021 mailed Aug. 26, 2020.

Iqbal H. M. S., et al: "Surface modification of high Performance polymers by atmospheric pressure plasma and failure mechanism of adhesive bonded joints", International Journal of Adhesion and Adhesives, Elsevier, Amsterdam, NL, vol. 30, No. 6, Apr. 9, 2010 (Apr. 9, 2010), pp. 418-424, XP027118608, ISSN: 0143-7496 [retrieved on Apr. 9, 2010], the whole document.

Supplementary EP Search Report for EP 20806389 dated Dec. 14, 2022.

Sandner, Horst, "Effects of surface pre-treatment on adhesive bonding of VICTREX PEEK", Victrex Europa GmbH, 1999.10.25, 4 pages, "Effects of surface pre-treatment on adhesive bonding of VICTREX PEEK", Victrex Europa GmbH, 1999.10.25, 4 pages, , Victrex Europa GmbH.

Supplementary EP Search Report, EP 20806477.4 dated Apr. 24, 2023.

* cited by examiner

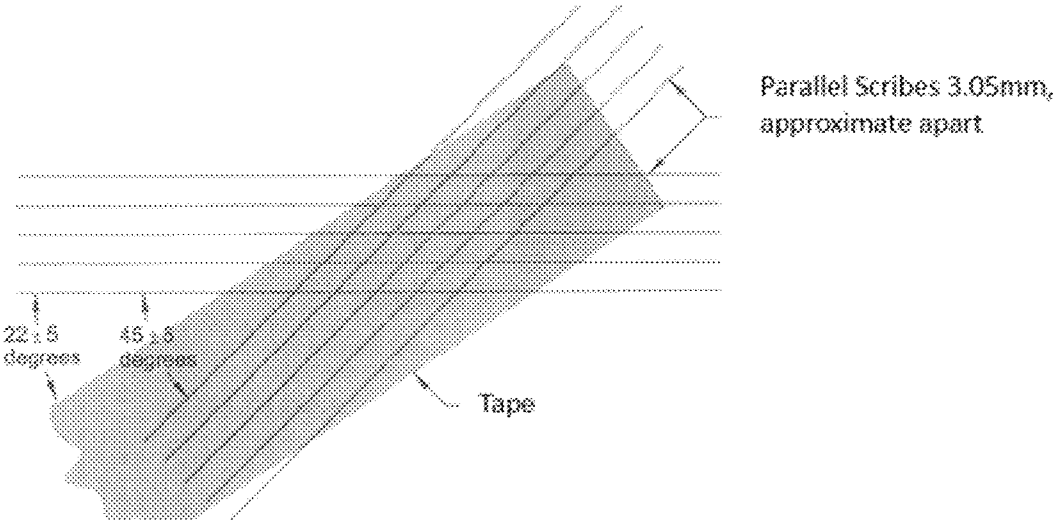
Parallel Scribes 3.05mm, approximate apart
22 ± 5 degrees
45 ± 5 degrees
Tape

THERMOPLASTIC SURFACES COMPRISING DIRECT BONDED CHEMICAL SEALANTS

TECHNICAL FIELD

This disclosure is directed to methods of treating thermoplastic surfaces rendering them suitable for the application of paint, adhesives, or surfacing films and the structures derived or derivable from these methods.

BACKGROUND

Fiber-reinforced, polymer matrix composites are high-performance structural materials that are commonly used aircraft components, high performance automobiles, boat hulls, and bicycle frames, owing to their resistance to aggressive environments, their high specific strength or high strength to density ratio, and their low weight.

Thermoset resins in combination with an autoclave curing process had been the central component of aerospace composite since their introduction to the aerospace industry. The constant trend to optimize the costs of raw materials and the related processing costs accelerated the use of thermoplastics instead of thermosets. Unlike thermosets, thermoplastics do not need to chemically crosslink and shape easily under sufficient heat and simply harden and maintain those shapes at speeds much faster than thermosets can cure. But thermoplastic materials, as applied in the aerospace industry, present surfaces to which paint and adhesives do not adhere, at least to the levels enjoyed by thermoset surfaces.

Direct painting of thermoplastic surfaces is very challenging due to low surface energy of the substrate. Typical pretreatment methods of thermoplastic substrates including plasma, UV, etching, flame and sanding, do not allow for satisfactory adhesion to multiple paints regarding the high requirements of aerospace specifications.

In part, for this and other reasons, more recently, composite structures used in the aerospace industry typically include a thermoset surfacing film to provide the required performance characteristics to the composite structures prior to painting. Surfacing films, such as epoxy-based films, are often incorporated into polymer composites to provide the composites with the surface quality required for aerospace applications. Further, these surfacing films may be functionalized, for example, to improve their resistance to lightning strikes, electrostatic discharge, and electromagnetic discharge.

However, still more recently, the aerospace industry looks for new methods for painting without adding the additional areal weight of the surfacing film.

To allow bonding of paint, adhesives, and surfacing films to such low-energy surfaces, several strategies have been developed, including chemical priming, the use of chemical adhesive compositions specifically formulated for use to bond such substrates, physical abrasion or chemical roughening, flame treatment, and acid or plasma etching, to make the surfaces more susceptible to bonding before the application of adhesive or paint. However, each of these methods carry trade-offs that need to be considered.

It will be appreciated that chemical treatments such as acid etching or chemical activation are restrictive in terms of commercial usage due to safety and waste handling concerns, process control, and cost.

Likewise, the chemical inertness of the surfaces of thermoplastic materials provides challenges with respect to the use of adhesives and surfacing films. It is known in the adhesives industry that certain substrates, such as certain high-performance plastics, are difficult to bond. Thermoplastics, such as PEEK (polyether ether ketone); PPS (polyphenylene sulfide); polyarylamide (PARA) or polyetherimide (PEI), are attractive structural polymers for their high specific strength or high strength to density ratio, but are also characterized by their poor bonding characteristics. Again, it is believed that the low surface energy of the thermoplastic is responsible for this. Application of UV/plasma to the thermoplastic surface leads to the formation of polar functional groups at the surface resulting in an increase in surface energy that allows for improved wetting and adhesion. Such new polar groups can often allow for forming chemical bonds with the adhesive which further increases the bond strength.

The chemical reaction capability of the functional groups strongly depends on the chemistry of the adhesives. Often the functional groups are not reactive enough for chemical bonding with a wide range of adhesives. To overcome the lack of reactivity of certain types of adhesives higher cure temperatures are required. Additionally, some tough adhesives require high temperatures for appropriate wettability of the substrates. There is a continued need in the aerospace industry for a bonding method can be used with a wide variety of adhesives with lower curing temperatures.

Similarly, plasma techniques are useful but often require large-scale equipment. And one of the shortfalls is the time that any plasma treated surface retains its ability to accept paint and adhesives.

While primers can be used to great effect there is always a need for an alternative method of activating a surface for subsequent bonding. This applies, in particular, to PEEK, PARA, PPS or PEI which tend to be difficult to bond plastics and thus typically bond strengths tend to be lower than for other plastics—and this generally applies even when primers are used.

Notwithstanding that state of the art proposed solutions to these issues exist, it is desirable to provide alternative solutions, so the end user has more choices available. The present disclosure is directed to providing an expanded choice of options to the industry.

SUMMARY

This disclosure is directed to composite structures comprising thermoplastic substrates having a chemical sealant bonded to one or more substrate surfaces, methods for making these composite structures, and articles comprising, derived, and derivable from these composite structures.

The definition of the thermoplastic substrates is set forth elsewhere herein. While not necessarily restricted as such, in certain more specific embodiments, the thermoplastic substrate comprises:

- (a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
- (b) a polymer containing a phenyl group directly attached to a carbonyl group, optionally wherein the carbonyl group is part of an amide group, such as polyarylamide (PARA);
- (c) a polyphenylene sulfide (PPS);
- (d) a polyphenylene oxide (PPO); or
- (e) a polyetherimide (PEI).

Additionally or alternatively, the thermoplastic substrate comprises a thermoplastic polymer comprising some chemical bonds that are susceptible to at least partial photolytic cleavage upon irradiation by actinic radiation of sufficient intensity and duration. In certain of these embodiments, the actinic radiation includes radiation with at least one wavelength in the range from about 10 nm to about 500 nm or about 100 nm to about 450 nm, preferably in a range of from about 200 nm to about 350 nm.

Additionally or alternatively, the thermoplastic substrate comprises a thermoplastic polymer whose linkages are susceptible to at least partial photolytic cleavage upon irradiation by at least one wavelength of actinic radiation at an energy in a range from about 0.1 $J/cm^2$ to about 300 $J/cm^2$ at the at least one wavelength preferably in the range from about 0.5 $J/cm^2$ to about 250 $J/cm^2$, or from about 1.5 $J/cm^2$ to about 250 $J/cm^2$ at the at least one wavelength.

The chemical sealants are more expansively described elsewhere herein, but for the sake of a preliminary understanding, the term chemical sealant may be described in terms of a mono-, di-, or polyfunctional organic, inorganic, or organometallic compound, which when bonded to the surface of the thermoplastic substrate, presents a pendant (such as alkyl or aryl) or functional group capable of promoting the adhesion of paint, paint primer, or adhesive thereto. In some embodiments, this pendant or functional group is chemically bonded to another material (for example, a paint, adhesive, or surfacing layer), thereby forming a bonding link (for example, a chemical covalent link) between the thermoplastic substrate and the other material.

In independent embodiments, the chemical sealants consist of, consist essentially of, or comprise an organic or organometallic compound having one or more functional groups including:

(i) one, two, or more epoxy or oxetane moieties;
(ii) one, two, or more glycidyl ether moieties;
(iii) one, two or more carboxy acid, carboxy ester, carboxy anhydride, amide or lactam moieties;
(iv) one, two or more hydroxyphosphate moieties;
(v) one, two or more —OH, —SH, or —NH moieties;
(vi) one, two, or more silanol, alkoxysilanol, or alkoxy silane moieties;
(vii) one, two, or more isocyanate moieties; and/or
(viii) one, two, or more alkoxytitanate or alkoxyzirconate moieties.

That is, each combination of these functional groups in a chemical sealant represents an independent embodiment. Moreover, the term “a chemical sealant” may also refer to one or more than one chemical entity (i.e., a mixture of different chemical entities).

Further embodiments include those where the surface chemical sealant is further adhered or bonded to another, second material. In such cases, the composite structure may be defined in terms where the chemical sealant is disposed between and/or bonded to both the thermoplastic substrate and the second material. For example, in one set of embodiments, the composite structure comprises the thermoplastic substrate, the chemical sealant, and an adhesive, paint (primer, intermediate, or topcoat layer), or surfacing film layer, wherein the sealant is disposed between and is preferably bonded to both the thermoplastic substrate and the adhesive, paint, or surfacing film layer, and the adhesive, paint, or surfacing film layer characterized as having a first surface adjacent to or preferably bonded to the sealant and a second surface opposite the first surface. In certain of these embodiments, the adhesive, paint, or surfacing film layer is applied to the coated surface but not yet cured. In other embodiments, the adhesive, paint, or surfacing film layer is cured and bonded to the chemical sealant. Where the composite structure comprises a surfacing film, in additional embodiments, the surface of the surfacing film distal to the surface bonded to the chemical sealant is painted.

Where such a composite structure comprises this second, that second material may comprise a thermoplastic or thermoset(ting) polymer. Exemplary materials useful in this application include benzoxazines, bismaleimides, epoxies, (meth)acrylates, cyanoacrylates (meth)acrylamides, epoxyacrylates, polyamides, polyesters, polyimides, polyurethanes, triazines, vinyl esters, or a copolymer or mixture thereof, preferably a (meth)acrylate, epoxy, or polyurethane polymer.

The strength of the adhesion for such coatings, especially for paints and adhesives forms additional embodiments, for example in the case where the second material comprises the adhesive or paint, that second material is sufficiently adhered to the composite structure to exhibit a score of at least 3B, 4B, or 5B using a standard 450 cross-hatch tape test according to ASTM D3359-09, the conditions of which are described more fully in the Examples.

Within the composite structure comprising the surfacing film bonded to thermoplastic substrates via the chemical sealant, the surfacing film may be uncured (e.g., as first prepared) or partially cured (e.g., after some post-processing). The surfacing film adhered to the thermoplastic substrate or surface has a higher degree of curing than the surfacing film as-applied.

In preferred embodiments, the surfacing film is an epoxy-based thermoset(ting) surfacing film. Various types of epoxy-based surfacing films are described herein.

As composite materials themselves, the surfacing films used or adhered to the substrate as disclosed herein, in some embodiments, comprise one or more organic, inorganic, or metallic additives which are incorporated into a polymer or pre-polymer matrix, for example additives such as flow agent, rheology modifiers, density modifiers, impact modifiers, preservatives, pigment, colorant, and the like.

Alternatively, or additionally, the surfacing films may comprise at least one particulate filler or additive comprising nano-, micro-, and/or macro-dimensioned powders, particles, beads, flakes, whiskers, or fibers. These forms, depending on material and function of the specific materials.

Alternatively, or additionally, the surfacing films may comprise one or more organic or inorganic fibers, fabrics, weaves, meshes, or porous sheets contained within a thermoset(ting) resin or polymer. In certain of these embodiments, the thermoset(ting) surfacing film comprises one or more peelable organic or inorganic fabrics, weaves, meshes, or porous sheets disposed at or beneath the second surface of the thermoset(ting) surfacing film.

Alternatively, or additionally, the surfacing films may comprise at least one electrically conductive material, suitable to use in lightning strike protection, electric current dissipation, EMI shielding, or heat transfer applications.

Alternatively, or additionally, the surfacing film is adhered to the thermoplastic substrate at a strength sufficient to score at least a 3B, 4B, or 5B for a 45° cross-hatched tape test according to ASTM D3359-09, the conditions of which are described more fully in the Examples.

Still other embodiments include those methods of preparing a composite structure. In certain of these, the methods comprise:

(a) exposing a surface of a thermoplastic substrate to actinic radiation and/or plasma sufficient to activate the surface of the thermoplastic substrate;

(b) applying a chemical sealant to the activated surface of the thermoplastic substrate to form a chemically sealed thermoplastic substrate having a surface of the chemical sealant; and (c) optionally heating the chemically sealed thermoplastic substrate.

As referring to the methods, the natures of the substrates, paints, adhesives, surfacing films, and methods of activating the bonds therebetween are consistent with the composite structures described elsewhere and are not reiterated further here. Other aspects of the methods (e.g., pressure and heat treatments) are further described elsewhere herein.

Still further aspects of the present disclosure include those articles comprising these disclosed composite structures and include components or aircraft and land-based vehicles, such as automobiles.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 1 illustrates the 45-degree cross-hatch scribe and tape position for an adhesion test described herein.

DETAILED DESCRIPTION OF ILLUSTRATIVE EMBODIMENTS

This disclosure is directed to composite structures comprising thermoplastic substrates comprising chemically sealed surfaces, methods for making these composite structures, and articles comprising these composite structures.

The presented disclosure addresses at least some of the shortfalls of existing methods used in the industry and involves the use of UV and/or plasma activation of thermoplastic surfaces in combination with one or more chemical sealers. As described elsewhere herein, this combination provides unique and unexpected performance advantages in providing sustainable surfaces on thermoplastic substrates that readily accept paint and adhesives over long periods of time after treatment. Moreover, the diverse range of chemical sealers that are operable by these methods allows for an equally diverse use of paints and adhesives.

In particular, the present disclosure provides for composite structures having sealed thermoplastic surfaces that accept and retain paint and adhesives with improved adhesion, relative to unsealed surfaces, and/or retain surface activation (e.g., by plasma and/or UV activation) for longer than unsealed surfaces such that further coatings with paint and adhesives can be applied and retained on an activated, sealed and aged thermoplastic surface with better adhesion than an unsealed and similarly aged activated thermoplastic surface.

The present disclosure may be understood more readily by reference to the following description taken in connection with the accompanying Figures and Examples, all of which form a part of this disclosure. It is to be understood that this disclosure is not limited to the specific products, methods, conditions or parameters described or shown herein, and that the terminology used herein is for describing particular embodiments by way of example only and is not intended to be limiting of any claimed invention. Similarly, unless specifically otherwise stated, any description as to a possible mechanism or mode of action or reason for improvement is meant to be illustrative only, and the disclosure herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Composite Structures

The present disclosure includes those embodiments of composite structures, wherein the composite structure comprises a thermoplastic substrate directly bonded to a chemical sealant, wherein the chemical sealant is one or more of the chemical materials described elsewhere herein. Additional embodiments include those where the composite structure comprising the chemically sealant is further bonded, directly or otherwise, to one or more of a paint, adhesive, or surfacing film.

As used herein, the term "direct bonding," and its grammatical variations, defines an interface between two surfaces, for example, the thermoplastic surface of the thermoplastic substrate and a first surface of the chemical sealant, wherein the thermoplastic surface and the first surface are adhered to each other at a surface that forms a common boundary of the thermoplastic surface and the first surface and preferably in the absence of any material not sourced from the thermoplastic surface and the first surface. The term "direct bonded" may likewise refer to a mechanism in which the bonding is achieved between the pendant functional group derived from the activation of a polymer moiety in the thermoplastic substrate bonds directly to a complementary bonding moiety in the chemical sealant, with the present of an intermediary linking group (e.g., without external adhesives or similar compositions).

The chemical sealant further comprising a second surface opposite the first surface the chemical sealant, such that the second surface is capable of further bonding or is further bonded to a second material. This second surface may be optionally functionalized as set forth elsewhere herein.

As described herein, the bonding between the thermoplastic substrate and the thermoset(ting) surfacing film is described as that wherein the thermoplastic substrate is directly bonded to a thermoset(ting) surfacing film. Equally, this bonding can be described as wherein the thermoset(ting) surfacing film is directly bonded to the thermoplastic substrate, or the wherein the thermoset(ting) surfacing film and the thermoplastic substrate are directly bonded together. Such distinctions are merely semantic, and descriptions should be considered equivalent throughout.

Thermoplastic Substrates

In the context of the present disclosure, the thermoplastic substrate comprises a thermoplastic polymer as is generally understood by those skilled in the art of polymer chemistry, but in preferred embodiments, the thermoplastic substrate comprises those thermoplastic polymers typically used in the aerospace industry.

Even in this context, the thermoplastic polymer of the thermoplastic substrate is broadly defined, but it appears that those thermoplastic polymers comprising linkages that are susceptible to photolytic cleavage upon irradiation by actinic radiation of sufficient intensity are preferred. Such linkages include linkages comprising heteroatoms, such as —O—, —S—, —C(O)—, —S(O)—, —$S(O)_2$—, —C(O)O—, —C(O)—N—, or combinations thereof. Such thermoplastic polymers include, but are not limited to, as independent embodiments, one or more of:

(a) a polyaryletherketone such as a polyether ether ketone (PEEK), polyether ketone ketone (PEKK), polyether ketone (PEK); polyether ether ketone ketone (PEEKK); or polyether ketone ether ketone ketone (PEKEKK);

(b) a polymer containing a phenyl group directly attached to a carbonyl group, optionally wherein the carbonyl group is part of an amide group, such as polyarylamide (PARA);

(c) a polyphenylene sulfide (PPS);

(d) a polyphenylene oxide (PPO); or (e) a polyetherimide (PEI).

Each of these polymers may comprise pendants in addition to the linking groups, such that, for example, the term "a polyether ether ketone (PEEK)" refers to both substituted and unsubstituted (e.g., by alkyl groups) PEEK polymers.

As described elsewhere herein, the thermoplastic substrate can also be, and generally is, a composite material, in which the thermoplastic polymer further comprises organic and/or inorganic additives such as flow agents, rheology modifiers, density modifiers, preservatives, pigment, colorant, and the like. The thermoplastic substrate is typically a structurally reinforced material, optionally comprising fibers, meshes, fabrics, or porous sheets contained within the polymer matrix, and is preferably a fiber reinforced composite material comprising multiple layers of polymer composites containing oriented fibers, etc. (e.g., carbon fibers), arranged in laminated stacks, such that the fibers in adjoining or alternate layers are oriented transverse to one another.

Where the interface is described as between a "thermoplastic surface of the thermoplastic substrate and a first surface of the thermoset(ting) surfacing film," the thermoplastic surface is the same as or chemically consistent with the thermoplastic polymer of the thermoplastic substrate. In this regard, the term "chemically consistent with" means that the polymer building blocks of the substrate and those of the surface are substantially the same, even if some of the bonding sites of the surfaces have been altered by photolytic activation.

Where the thermoplastic polymers are described as comprising linkages that are susceptible to photolytic cleavage upon irradiation by actinic radiation of sufficient intensity, in some embodiments, that actinic radiation includes radiation with at least one wavelength in the range from about 10 nm to about 500 nm or about 100 nm to about 450 nm, preferably in a range of from about 200 nm to about 350 nm. In additional embodiments, that actinic radiation includes radiation with one or more wavelength in the range from about 100 nm to 125 nm, from 125 to 150 nm, from 150 nm to 175 nm, from 175 nm to 200 nm, from 200 nm to 225 nm, from 225 nm to 250 nm, from 250 nm to 275 nm, from 275 nm to 300 nm, from 300 nm to 325 nm, from 325 nm to 350 nm, from 350 nm to 375 nm, from 375 nm to 400 nm, from 400 nm to 425 nm, from 425 nm to 450 nm, from 475 nm to 500 nm, or a range that is defined by any two or more of the foregoing ranges, for example from 300 nm to 400 nm, or from 275 nm to 325 nm. In other embodiments, the actinic radiation includes light or radiation with at least one wavelength characterized as UV-A (about 315-400 nm, or 320-390 nm) and UV-B (280-315 nm, or 280-320 nm). In other embodiments, the actinic radiation includes light or radiation with at least one wavelength characterized as UV-C (about 100-280 nm), UV-V (395-445 nm), near ultraviolet (NUV; 300-400 nm), middle ultraviolet (MUV; 200-300 nm), far ultraviolet (FUV; 122-200 nm), vacuum ultraviolet (VUV; 10-200 nm), or extreme ultraviolet (EUV; 10-120 nm).

Where the thermoplastic polymers are described as comprising linkages that are susceptible to photolytic cleavage upon irradiation by actinic radiation of sufficient intensity, in some embodiments, those polymers include those that are activated by at least one wavelength of actinic radiation at an energy in a range from about 0.1 $J/cm^2$ to about 300 $J/cm^2$ at the at least one wavelength preferably in the range from about 0.5 $J/cm^2$ to about 250 $J/cm^2$, or from about 1.5 $J/cm^2$ to about 250 $J/cm^2$ at the at least one wavelength. Additional embodiments include those where the activating energies are defined by one or more ranges of from 0.1 to 0.5 $J/cm^2$, from 0.5 to 1 $J/cm^2$, from 1 to 1.5 $J/cm^2$, from 1.5 to 2 $J/cm^2$, from 2 to 2.5 $J/cm^2$, from 2.5 to 3 $J/cm^2$, from 3 to 3.5 $J/cm^2$, from 3.5 to 4 $J/cm^2$, from 4 to 4.5 $J/cm^2$, from 4.5 to 5 $J/cm^2$, from 5 to 5.5 $J/cm^2$, from 5.5 to 6 $J/cm^2$, from 6 to 6.5 $J/cm^2$, from 6.5 to 7 $J/cm^2$, from 7 to 7.5 $J/cm^2$, from 7.5 to 8 $J/cm^2$, from 8 to 9 $J/cm^2$, from 9 to 10 $J/cm^2$, from 10 to 25 $J/cm^2$, from 25 to 50 $J/cm^2$, from 50 to 100 $J/cm^2$, from 100 to 150 $J/cm^2$, from 150 to 200 $J/cm^2$, from 200 to 250 $J/cm^2$, from 250 to 300 $J/cm^2$, or the range is defined by any two or more of the foregoing ranges, for example from 0.1 to 250 $J/cm^2$, or from 0.5 to 100 $J/cm^2$. The simultaneous or sequential irradiating by two, three, four, or more wavelengths or ranges of wavelengths are also seen as further independent embodiments Chemical Sealants In the context of the present disclosure, and as described elsewhere herein, the term "chemical sealant" refers to one or more chemical materials comprising a mono-di-, or polyfunctional organic, inorganic, or organometallic compound, which when bonded to the surface of the thermoplastic substrate, presents either pendant (such as alkyl, alkenyl, alkynyl, or [hetero]aryl) or heteroatom functional groups capable of promoting the adhesion of paint, adhesive, or surfacing film thereto or which actually has bonded to the paint, adhesive, or surfacing film, thereby forming a bonding link (for example, a covalent chemical link) between the thermoplastic substrate and the paint, adhesive, or surfacing film.

In this way, the chemical sealant can be viewed as a tailorable adhesion promoter, allowing any given thermoplastic substrate to be made receptive to bonding to a wide range of potential paint, adhesive, or surfacing film by suitable choice of chemical sealants. Additionally, or alternatively, the chemical sealants may be seen as coupling agents between the thermoplastic substrates and potential paints, adhesives, or surfacing films. Further, the inventors have discovered that the use of a chemical sealer allows for bonding at lower temperatures, perhaps by increasing the number of highly reactive functional groups at the surface such that the formation of new bonds to various paint, or other, chemistries can occur at room or slightly elevated temperatures. These features allow for an expanded range of thermoplastic materials as well as heat sensitive materials to be used in the methods and products of the invention.

Still further, whereas activated thermoplastic substrates—whether activated by UV light, plasma, or a combination of UV-light and plasma—typically remain chemically activated for only short periods of time, the use of these chemical sealants composite structures that retain this chemical activity for significantly longer periods of time, thereby significantly improving the manufacturing options for functionalizing the thermoplastic substrates.

Various examples of such chemical entities are described elsewhere herein. The term "chemical sealant," can be defined broadly but in specific, independent embodiments, such a chemical sealant can consist of, consist essentially of, or comprise an organic or organometallic compound having one or more heteroatom-containing functional groups including:

(i) one, two, or more epoxy or oxetane moieties;
(ii) one, two, or more glycidyl ether moieties;
(iii) one, two or more carboxy acid, carboxy ester, carboxy anhydride, amide or lactam moieties;
(iv) one, two or more hydroxyphosphate moieties;
(v) one, two or more —OH, —SH, or —NH moieties;
(vi) one, two, or more silanol, alkoxysilanol, or alkoxy silane moieties;
(vii) one, two, or more isocyanate moieties; and/or
(viii) one, two, or more alkoxytitanate or alkoxyzirconate moieties.

Each combination of these functional groups in a chemical sealant represents an independent embodiment. Where the organic or organometallic compound has two, or more functional moieties per chemical compound, these functional moieties may be the same or different. It may be envisioned as preferred that the two functional moieties per chemical compound are different, or at least have different reactivities, either in terms of kinetics or mechanisms of actions, to allow for the staged reaction of the chemical sealant with the thermoplastic substrate. That is, it is preferred that a given chemical compound contains two different functional moieties, such that the first of these reacts preferentially with the activated thermoplastic surface, leaving the second functional moiety unreacted or available for binding to a second material, such as the paint, adhesive, or surfacing. In two, non-limiting examples, then, the chemical sealant contains (a) two or more of any of the moieties listed above in (i) to (viii) (e.g., an epoxy-silane); or (b) one or more of the moieties listed above in (i) to (viii), as well as one or more one or more alkyl, alkenyl, alkynyl, or [hetero] aryl moieties (e.g., an olefinic hydroxyphosphate).

The term "a chemical sealant" may also refer to one or more than one chemical entity. The chemical sealant may be applied as a mixture of the chemical sealant compound (or precursor thereof), and appropriate solvents and additives (e.g., viscosity modifiers, fillers, tackifying agents, etc.) that are present for handling and/or to promote an appropriate finish.

In certain independent embodiments, the chemical sealant, as a compound, consists of, consists essentially of, or comprises an organic or organometallic compound having one, two, or more epoxy or oxetane moieties. In independent embodiments, such exemplary epoxy or oxetanes include diglycidyl ethers of Bisphenol A, F, S, E, and M resins; epoxy novolacs; glycidyl ethers of mono-, di-, tri-, and poly-phenols; glycidyl ethers of tetraphenolethane; hydroxyl-phenyl-methane-based epoxy resins; naphthalene-based epoxies; triglycidylethers of amino-phenols; tetraglycidylethers of methylenedianilines; glycidyl ethers of aliphatic polyols; cycloaliphatic epoxies; halogen-, silicon-, and phosphorus-modified epoxies; and epoxies modified with rubbers (such as butadiene, butadiene acrylonitrile copolymers). In preferred embodiments, the chemical sealant is or comprises an organic or organometallic compound having one, two, or more glycidyl ether moieties.

In certain independent embodiments, the chemical sealant consists of, consists essentially of, or comprises an organic or organometallic compound having one, two, or more carboxy acid, carboxy ester, carboxy anhydride, amide or lactam moieties. Exemplary embodiments within this group include, but are not limited to mono-, di-, and polycarboxylic acids, including optionally substituted $HO_2C$—R-$CO_2H$, where R can be aliphatic (linear, branched, or cyclic) or aromatic $C_1$-$C_{24}$ mono-carboxyacids (e.g., formic, acetic, propionic acids, etc. through fatty acids), optionally substituted $C_2$-$C_{18}$ di-carboxyacids (e.g., oxalic, malonic, succinic, glutaric, adipic, pimelic, suberic, azelaic, sebacic, etc., maleic, fumaric, glutaconic, itaconic, gluconic, citraconic, mesaconic, itaconic, etc.; phthalic, isophthalic, terephthalic, diphenic, 2,6-naphthalenedicarboxilic acids)(optionally substituted with one or more hydroxy group); aliphatic and aromatic natural and non-natural amino acids (e.g., alanine, arginine, asparagine, aspartic acid, cysteine, glutamic acid, glutamine, glycine, histidine, isoleucine leucine, phenylalanine, proline, serine, threonine, tryptophan, tyrosine, and valine); phthalic anhydride, pyromellitic dianhydride, ethylenediamine tetraacetic dianhydride, naphthalenetetraacetic di-anhydride.

In certain independent embodiments, the chemical sealant consists of, consists essentially of, or comprises an organic or organometallic compound having one, two, or more hydroxyphosphate moieties. Exemplary embodiments within this group include, but are not limited to, mono- and di-alkyl phosphate esters, such as $C_{1-12}$ alkyldihydrogen phosphate; di-$C_{1-12}$ alkylhydrogen phosphate; $C_{1-12}$-alkyldiphosphate; $C_{1-12}$-trialkyl phosphate; mono- and di-alkenyl phosphate esters, such as $C_{2-12}$ alkenyldihydrogen phosphate; di-$C_{2-12}$ alkenylhydrogen phosphate; $C_{2-12}$-alkenyldiphosphate; $C_{2-12}$-trialkenyl phosphate; and phytic acid; and phytic acid.

In certain independent embodiments, the chemical sealant consists of, consists essentially of, or comprises an organic or organometallic compound having one, two, or more —OH, —SH, or —NH moieties. Exemplary embodiments within this group include, but are not limited to include diols, triols, polyols, alkyl amines, dialkyl amines, alkanolamines, glycol amines, hydroxy thiols, dithiols, hydroxyalkyl thiols, amine alkylthiols, alkyldithiols; for example such as ethanolamines, propanolamines, dimethyl ethanolamine, N-methylethanolamine, aminomethyl propanol, optionally alkoxylated or aminated glycerol, optionally alkoxylated or aminated neopentyl glycol; optionally alkoxylated or aminated trimethylol propane, optionally alkoxylated or aminated pentaerythritol; optionally alkoxylated or aminated sorbitol, maltitol, sorbitol, xylitol, erythritol, isomalt or other sugar alcohol; alkylated or alkoxylated glycol amine; diethylene glycol amine, methoxypolyethylene glycol amine; d-glucamine; hexa(ethylene glycol) dithiol, hexanedithiol, 2,2'-thiodiethanethiol, mercaptoethanol, 2,3-dimercapto-1-propanol, 2-mercaptobenzyl alcohol, cysteamine.

In certain independent embodiments, the chemical sealant consists of, consists essentially of, or comprises an organic or organometallic compound having one, two, or more silanol, alkoxysilanol, or alkoxy silane moieties. Exemplary embodiments within this group include, but are not limited to compounds of formula $R_xSi(OH)_{4-x}$, where R is independently $C_{1-12}$ alkoxy, $C_{1-12}$ alkyl, $C_{7-18}$ aryloxy, $C_{7-18}$ aryl, $C_{7-18}$ alkoxyaryl, $C_{7-18}$ alkaryl, $C_{7-18}$ aralkyl and x is independently 1, 2, or 3; for example, trimethylsilanol, epoxysilane oligomers, and diphenylsilanediol; and polyfunctional silanes, including alkoxy silanes containing organic functional groups including epoxy, amine, methacryloxy, acryloxy, ureide, isocyanate, isocyanurate, thiols, for example 3-glycidoxypropyl trimethoxysilane, 3-methacryloxypropyl trimethoxysilane, 3-aminopropyltrimethoxysilane, 3-ureidopropyltrialkoxysilane, 3-isocyanatepropyltrialkoxysilane, tris-(trimethoxysilylpropyl)isocyanurate, and 3-mercaptopropyltrimethoxysilane.

In certain independent embodiments, the chemical sealant consists of, consists essentially of, or comprises an organic or organometallic compound having one, two, or more isocyanate moieties.

In certain independent embodiments, the chemical sealant consists of, consists essentially of, or comprises an organic or organometallic compound having one, two, or more alkoxytitanate or alkoxyzirconate moieties.

Stacked Composite Structures Further Comprising Adhesives, Paints, or Surfacing Films As described elsewhere herein, the composite structures may comprise a stacked composite of the thermoplastic substrate, the chemical sealant, and a further material, such as an adhesive, paint (primer, intermediate, or topcoat layer), or surfacing film layer, wherein the sealant is disposed between and/or is bonded to both the thermoplastic substrate and the adhesive, paint, primer, or surfacing film layer. In such embodiments, the adhesive, paint, or surfacing film layer characterized as having a first surface bonded to the sealant and a second surface opposite the first surface. This provides for further embodiments in which the second surface of the adhesive, paint, or surfacing film layer can be still further functionalized by bonding to still additional materials (e.g., the second surface of the adhesive may be bonded to a third material, the second surface of a primer coating may be overcoated with a top coat paint coating, or the second surface of the surfacing layer may be painted, or otherwise functionalized.

The chemistries of this adhesive, paint, or surfacing film layer are flexibly chosen, depending on the nature of the pendant functional group of the chemical sealant, and may comprise a thermoplastic or thermoset(ting) polymer, or other materials.

For example, the adhesive, paint, primer, or surfacing film layer may described in terms of comprising a benzoxazine, a bismaleimide, an epoxy, a (meth)acrylate, a cyanoacrylate, a (meth)acrylamide, an epoxy-acrylate, a polyamide, a polyester, a polyimide, a polyurethane, a triazine, a vinyl ester, or a copolymer or mixture thereof, preferably a (meth) acrylate, epoxy, or polyurethane polymer or copolymer. Particularly useful materials for use as adhesives and paints include epoxies, (meth)acrylates, (meth)acrylamides, and polyurethanes.

The composite structures further comprising adhesives, paints, or surfacing film layers include those embodiments in which these materials are applied but not yet cured, and independently in which the materials are partially or fully cured. Again, the state of cure may be considered to exist as a gradient relative to the materials as applied. Stated differently, in separate embodiments, the adhesives, paints, or surfacing film layers may independently exist as provided, or after some step has been take or time has passed to allow the as-applied materials to further cure (e.g., polymerize or crosslink).

Within this context of composite structures further comprising adhesives, paints, or surfacing film layers, these materials may comprise epoxies. Suitable epoxy materials include, but are not limited to one or more of diglycidyl ether of Bisphenol A, F, S, E, and M resins; epoxy novolacs; glycidyl ethers of mononuclear, di-, tri-hydric, and polynuclear phenols; glycidyl ethers of tetraphenolethane; hydroxyl phenyl methane based epoxy resins; naphthalene based epoxy resins; triglycidylether of amino-phenol resins; tetraglycidylether of methylenedianiline resins; glycidyl ethers of aliphatic polyols; cycloaliphatic epoxy resins; modified grades of all epoxy types (containing Halogen, Silicon, Phosphorus); toughened grades/Adducts of all epoxy types with rubbers (such as butadiene, butadiene acrylonitrile copolymers).

Within this context of composite structures further comprising adhesives, paints, or surfacing film layers, these materials may comprise (meth)acrylics. Suitable (meth) acrylates including those based on acrylate or methacrylate components including: methyl acrylate, methyl methacrylate, 2-ethythexyacrylate, 2-ethylhexyl methacrylate, tetrahydrofurfuryl acrylate, tetrahydrofurfuryl methacrylate, phenoxyethyl acrylate, phenoxyethyl methacrylate, ethyl acrylate, ethyl methacrylate, propyl acrylate, propyl methacrylate, n-butyl acrylate, n-butyl methacrylate, t-butyl acrylate, t-butyl methacrylate, isobornyl acrylate, isobornyl methacrylate, isooctyl acrylate, isooctyl methacrylate, acrylamide, n-methyl acrylamide, lauryl methacrylate and stearyl methacrylate, cyclohexyl methacrylate, hydroxyethyl acrylate, hydroxyethyl methacrylate, hydroxyethyl acrylate, hydroxypropyl methacrylate.

Other suitable acrylates or methacrylates are multimeric acrylates and methacrylates as shown in Formula I, below:

Formula I

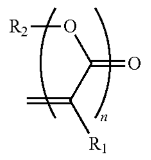

wherein, $R_1$ may be H, halogen, or $C_{1-20}$ alkyl, suitably $CH_3$ and $R_2$ can link a plurality of monomeric acrylates and/or methacrylates;

wherein $R_2$ may be selected from the group consisting of $C_{1-20}$ alkyl, $C_2$-$C_{20}$ alkenyl, $C_3$-$C_{20}$ cycloalkyl, $C_3$-$C_{20}$ cycloalkyl optionally having at least one C—C unsaturated bond in the ring, $C_6$-$C_{20}$ aryl, $C_4$-$C_{20}$ heteroaryl, urethane, urea, glycol, ether, polyether or glycidyl component, and combinations thereof, optionally substituted one or more times with at least one of hydroxy, amino, halogen, cyano, nitro, $C_1$-$C_5$ alkoxy, and/or $C_1$-$C_5$ thioalkoxy; and n can be 1, 2, 3, or 4 acrylate units. Examples include: diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol dimethacrylate, tetraethylene glycol dimethacrylate, triethylene glycol diacrylate, triethylene glycol dimethacrylate, trimethylolpropane triacrylate, trimethylolpropane trimethacrylate, pentaerythritol triacrylate, pentaerythritol trimethacrylate, tris(2-hydroxyethyl) isocyanurate triacrylate, tris(2-hydroxyethyl)isocyanurate trimethacrylate, tricyclodecanedimethanol diacrylate, tricyclodecanedimethanol dimethacrylate and ethoxylated bisphenol diacrylates and dimethacrylates.

Further suitable (meth)acrylates may be chosen from among polyfunctional (meth)acrylates, such as, but not limited to, di- or tri-functional (meth)acrylates like polyethylene glycol di(meth)acrylates, tetrahydrofuran 10 (meth) acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

The acrylate or methacrylate composition may comprise a curable component, suitably a maleate, fumarate or maleimide component or combinations thereof. Examples include (but are not limited to) mono-2-(acryloyloxy)ethyl maleate, mono-2-(methacryloyloxy)ethyl maleate, maleic anhydride, maleic acid, toxilic acid, fumaric acid, fumaramide, fumaryl nitrile, fumaryl chloride, fumarate monoethyl ester salts of zinc, calcium and magnesium, 2,5-pyrroledione and 1, 1'-(methylenedi-4,1-phenylene) bismaleimide, or combinations thereof.

The paints or adhesives contemplated by the present composite structures may further comprise a toughener component. Examples of toughener components include synthetic rubbers, such as acrylonitrile/butadiene rubber (NBR rubber), a polyurethane, styrene/butadiene rubber, styrene/butadiene/methacrylate rubber, chloroprene rubber or butadiene rubber, a natural rubber, a styrene thermoplastic elastomer such as styrene/polybutadiene/styrene synthetic rubber, a polyacrylate or polymethacrylate elastomer, a methacrylate/acrylate block co-polymer or an olefin thermoplastic elastomer such as polystyrene/EPDM (an ethylene/propylene/conjugated diene co-polymer) synthetic rubber. Chlorinated and chlorosulfonated polyethylene elastomers can also be used.

Thermoplastic or Thermoset(ting) Surfacing Films

As described herein, further embodiments include those comprising a composite structure comprising a thermoplastic substrate and a thermoplastic or thermoset(ting) surfacing film, adhered together by the chemical sealant. The bond between the chemical sealant and the surfacing film may be physical or chemical in nature. That is, the surfacing film may be simply positioned adjacent to the chemical sealant and held in place either manually or by physical interpenetrations of imperfections in the respective surfaces. In embodiments, the bonding between these surfaces is more chemical in nature, including by covalent bonding, where the functional groups of the activated surface of the thermoplastic resin have been presented to and reacted with respective bonding moieties in the surfacing film.

Again, the surfacing film may comprise a thermoplastic or thermoset(ting film, but in preferred embodiments, the surfacing film is a thermoset(ting) film, the thermoset(ting) surfacing film comprises a thermoset(ting) polymer as is generally understood by those skilled in the art of polymer chemistry. In preferred embodiments, the thermoset(ting) surfacing film comprises those (pre-)polymer systems typically used in this context in the aerospace industry—e.g., comprising a benzoxazine, a bismaleimide, an epoxy, a (meth)acrylate, a cyanoacrylate, a (meth)acrylamide, an epoxy-acrylate, a polyamide, a polyester, a polyimide, a polyurethane, a triazine, a vinyl ester, or a copolymer or mixture thereof, preferably a (meth)acrylate, epoxy, or polyurethane polymer or copolymer.

Epoxy-based thermoset(ting) surfacing films appear to be preferred, both in terms of function/performance and workability. In this context, in specific embodiments, the epoxy-based surfacing films include epoxy resins that include, but are not limited to one or more of diglycidyl ether of Bisphenol A, F, S, E, and M resins; epoxy novolacs; glycidyl ethers of mononuclear, di, tri-hydric, and polynuclear phenols; glycidyl ethers of tetraphenolethane; hydroxyl phenyl methane based epoxy resins; naphthalene based epoxy resins; triglycidylether of amino-phenol resins; tetraglycidylether of methylenedianiline resins; glycidyl ethers of aliphatic polyols; cycloaliphatic epoxy resins; modified grades of all epoxy types (containing Halogen, Silicon, Phosphorus); toughened grades/Adducts of all epoxy types with rubbers (such as butadiene, butadiene acrylonitrile copolymers). The inventors have seen good results with Loctite® EA 9845 Aero, Loctite® EA 9845 LC, Loctite® EA 9845 P&P, Loctite® EA 9845 LC P&P, and Loctite® EA 9837.1 epoxy-based composite surfacing film in the present methods, especially but not exclusively with PEEK substrates, and so these are considered preferred embodiments. In other independent embodiments, epoxy-based surfacing films designated as Loctite EA 9837.1 Aero (known as SynSkin HC 9837.1), Loctite EA 9837.1 BLK Aero, Loctite EA 9837.1 LS Aero, Loctite EA 9845 Aero, Loctite EA 9845 LC Aero, Loctite EA 9845 LA Aero. Loctite EA 9845 P&P Aero, and Loctite EA 9845 LC P&P, and TenCate TC235SF-1, Aeroglide surfacing films, Surface Master 905 from Cytec, and Redux 641 from Hexcel can also be used in these applications.

Independent embodiments include those where the thermoset(ting) surfacing films are not yet cured, partially cured, or fully cured when adhered to the thermoplastic surface. Each of these cure stages may appear at different stages of processing.

Typically, the thermoset(ting) surfacing film has a total thickness, as applied, in a range of from 12.5 to 12,500 microns (0.5 to 500 mils), preferably from 12.5 to 1250 microns (0.5 to 50 mils). In other embodiments, the total thickness may be described in terms of a range of from 12.5 to 25 microns, from 25 to 50 microns, from 50 to 75 microns, from 75 to 100 microns, from 100 to 125 microns, from 125 to 150 microns, from 150 to 175 microns, from 175 to 200 microns, from 200 to 250 microns, from 250 to 300 microns, from 300 to 400 microns, from 400 to 450 microns, from 450 to 500 microns, from 500 to 1000 microns, from 1000 to 1500 microns, from 1500 to 2000 microns, from 2000 to 2500 microns, from 2500 to 5000 microns, from 5000 to 7500 microns, from 7500 to 10,000 microns, from 10,000 to 12,500 microns, or a combination of two or more of these ranges, for example, from 25 to 500 microns, from 50 to 300 microns, or from about 25 to 125 microns.

In other embodiments, the thermoset(ting) surfacing film can have an areal weight in a range of from 0.005 to 0.15 lb./ft$^2$ (psf) or from 24 g/m$^2$ to 730 g/m$^2$. Alternatively, or additionally, or this areal mass may be defined by one or more ranges of from 25 to 50 g/m$^2$, from 50 to 100 g/m$^2$, from 100 to 200 g/m$^2$, from 200 to 300 g/m$^2$, from 300 to 400 g/m$^2$, from 400 to 500 g/m$^2$, from 500 to 600 g/m$^2$, from 600 to 700 g/m$^2$, or from 700 to 730 g/m$^2$. For aircraft applications, preferred ranges include those from 0.005 to 0.01 psf (from 25 to 50 g/m$^2$), from 0.005 to 0.02 psf (from 25 to 100 g/m$^2$), from 0.005 to 0.03 psf (from 25 to 150 g/m$^2$), from 0.005 to 0.04 psf (from 25 to 200 g/m$^2$), from 0.005 to 0.05 psf (from 25 to 250 g/m$^2$), or from 0.005 to 0.06 psf (from 25 to 300 g/m$^2$), or some combination of two or more of these ranges.

As is the case with the thermoplastic substrate, the thermoset(ting) surfacing film is also a composite material, comprising one or more organic, inorganic, or metallic additives which are incorporated into the thermoset(ting) polymer or pre-polymer matrix, for example additives such as flow agent, rheology modifiers, density modifiers, preservatives, pigment, colorant, and the like. In certain embodiments, these additives include continuous or chopped fibers, whiskers, nanomaterials, particulate minerals, ceramics, impact modifiers, and/or filled or hollow capsules. The at least one particulate filler or additive may comprise nano-, micro-, and/or macro-dimensioned powders, particles, beads, flakes, whiskers, or fibers, wherein the at least one particulate filler or additive comprises a ceramic, polymer, glass, or metal/metalloid material or alloy thereof, or coated hybrid materials, for example including a carbide, nitride, or oxide of aluminum, boron, silicon, tin, zirconium, or aluminum, carbon, copper, nickel, Sn—Zn, or stainless steel, or aramid. These fillers may be distributed substantially uniformly throughout the thickness dimension of the surfacing film or may be concentrated toward one of the first or second surfaces thereof. These particulates fillers may comprise one or more of any of the functional materials described herein, e.g., ceramic, polymer, glass, or metal/metalloid material or alloy thereof.

Alternatively, or additionally, such a surfacing film may comprise one or more organic, inorganic, or metallic fibers, meshes, fabrics, or porous sheets contained within a thermoset(ting) resin.

Such fibers may serve as reinforcing fibers that include continuous or chopped fibers or whiskers of alumina, aramid, boron, carbon, glass, silicon carbide, or mixtures thereof. Glass and/or carbon fibers are particularly preferred.

The one or more organic or inorganic fibers, fabrics, weaves, meshes, or porous sheets may be contained within a thermoset(ting) resin or (pre)polymer, or may comprise one or more peelable organic or inorganic fabrics, weaves, meshes, or porous sheets disposed at or beneath the second surface of the thermoset(ting) surfacing film. The use of such peelable materials allows for subsequent removal of the peelable fabric, weave, mesh, or sheet from the second surface opposite the first surface the thermoset surfacing film to provide a fresh surface suitable for later painting. In certain embodiments of the present disclosure, the composite structure is one in which such a peelable layer has been removed, revealing such a paint-ready surface.

In further embodiments, the composite structure is one in which paint or other filled or unfilled or clear coat finish has been applied to this paint-ready surface; i.e., wherein the second surface of the thermoset surfacing film is so painted or coated. The choice of paint is not limiting, so long as the paint is compatible with the final surface composition. Preferred paints are those comprising a polyacrylate, a polyester, a polymethacrylate, a polyurethane, or a copolymer or mixture thereof. The bonding of the paint to the exposed surface can be physical or chemical, or both, depending on the nature of the paint chosen. It is expected that the exposed surface will have a higher concentration of reactive chemical groups attached to the surface, resulting from the peeling process, than it would otherwise have had in the absence of the process described herein. As a result, it is also expected that the resulting bonding between the exposed surface and the paint will be more likely to have a higher contribution of chemical interaction with the paint than it would have had without the process, thereby providing for a more integral bond.

As used herein, the term “fabric” refers to woven or non-woven material. The term “film” connotes a flat polymer section, consistent with its ordinary meaning. The fabric or film size may vary to include sheets, tapes, or continuous rolls. The film may be porous, semi-permeable, or non-porous. Non-porous perforated films are preferred. Both fabrics and films may include materials comprising a polyester, a polyamide, a polyethylene, a polypropylene, a polyethylenenaphthalate (PEN), a polyethylenterephthalate (PET), a polybutylenterephthalate (PBT), a polyether etherketone (PEEK), a polyamide, a polyaryletherketone (PAEK), a polyethersulfone (PES), a polyethylenenimine (PEI), a poly (p-phenylene sulfide) (PPS), a polyvinyl chloride (PVC), a fluorinated or perfluorinated polymer (such as a polytetrafluoroethylene (PTFE or Teflon®), a polyvinylidene difluoride (PVDF), a polyvinyl fluoride (PVF or Tedlar®)), or a mixture or copolymer thereof. Preferred exemplary fabrics may comprise a polyester, a polyamide, carbon fibers, glass or other inorganic fibers or Kevlar®. Polyesters, nylons, or mixtures thereof are especially useful as fabrics or films for this purpose. Each fabric or film may be coated or impregnated by laminating adhesive resin. The resin may be from 5 to 50% by weight or 10 to 40% by weight of the surfacing film composition. The polymer surface of either the fabrics or films may optionally be coated with silica, siloxane, aluminum oxide, or metal, or treated with plasma or silane.

The fabric or film may be single-ply or multi-ply fabric constructions. Where the fabric is woven, the woven fabric comprises tightly woven mono- or multi-filament tows. Tightly woven, high density weaves are preferred to provide a smooth finish, compatible with the finish desired for the final painted product. Accordingly, preferred weaves include a plain weave, a harness satin weave, a crow-foot satin weave, or a twill, with a crow-foot satin weave style being most preferred. Polymer films may be envisioned as the ultimate closed weave and calendared fabric, with polymer films providing a surface roughness which can be significantly less than even highly calendared, closed weave fabrics.

The tightness of the weave can be described in terms of warp ends and fill ends per inch, both terms being readily understood by those skilled in the art of woven fabrics. Fabrics or films of this invention comprise those which independently contain at least 80 warp ends per inch, or at least 100, 120, 140, or 160 warp ends per inch, and at least 40 fill ends per inch, or at least 60, 80, or 100 fill ends per inch. For example, good results are obtained wherein the fabrics or films contain at least about 80 warp ends per inch and at least about 40 fill ends per inch. More preferred embodiments include those weaves wherein the fabric is woven with at least 120 warp ends per inch and at least 60 fill ends per inch. Such weaves are commercially available, for example, from Precision Fabrics Group of Greensboro, North Carolina, and those characterized as providing “fine surface impressions” are most preferred. Exemplary compositions include 60004/56111 polyester, 51789/52006 nylon, and 52008/56115 nylon materials. Fiber or yarn thicknesses are such as to provide minimally open weaves, given the warp end/fill end parameters, and consistent with the thickness of the overall fabric.

Alternatively, or additionally, the thermoset(ting) surfacing film may comprise one or more sheet of a second functional material at least a portion of which is in the form of a porous woven or non-woven fabric, expanded metallic foil or polymer film, grating, mesh, screen, or web. In certain preferred embodiments, these porous sheets of additional functional materials are present in or on the surfacing film. As such, the surfacing film can optionally be mono-functional (e.g., also containing electrically conductive metal filaments or fibers) or multi-functional. Such additional materials include those electrically conductive materials, suitable to use in lightning strike protection, electric current dissipation, EMI shielding, or heat transfer applications.

That is, in some embodiments, these additional functional materials may be present as a plurality of sheets of functional materials or as a single sheet may comprise materials (including so-called hybrid materials) having multiple different functions. It is appreciated that the peelable porous sheets described above provide one functional capability (i.e., peelability), but in the context used here, the term "functional" refers to an attribute of the sheet material which imparts some character to the film that improves performance, e.g. impact stability, dimensional stability, electrical conductivity, and heat transfer capability, so as to provide improved strength, EMI shielding material, and static and lightning strike protection to a substrate to which it is ultimately attached. Further, the phrase "at least one sheet of a second functional material" can be one or more sheets of a non-peelable functional material, as to distinguish from the peelable fabric or sheet. That is, such second functional materials represent embodiments including (a) one sheet of one or more (non-peelable) functional materials, as described below; (b) two or more sheets of the same (non-peelable) functional material, (c) two or more sheets of different (non-peelable) materials, or (d) two or more sheets of two or more (non-peelable) functional materials.

Again, the porous sheets of the second functional materials may comprise woven fabrics and expanded films, but additionally these sheets may also comprise non-woven fabrics, meshes, screens, or webs of continuous or chopped organic or inorganic fibers, including the same or similar materials to those useful for the peelable porous sheets—i.e., one or more fluorinated or perfluorinated polymer (such as a polytetrafluoroethylene (PTFE or Teflon®), a polyvinylidene difluoride (PVDF), a polyvinyl fluoride (PVF or Tedlar®)), (meth)acrylate, (meth)acrylamides, polyester, polyamide, polyethylene, polypropylene, polyethylenenaphthalate (PEN), polyethylenterephthalate (PET), polybutylenterephthalate (PBT) polyether etherketone (PEEK), polyaryletherketone (PAEK), polyethersulfone (PES), polyethylenenimine (PEI), poly (p-phenylene sulfide), polyvinyl chloride, or a co-polymer or mixture thereof. Other useful organic materials include polyaniline, polypyrrole, polythiophene, or a copolymer or mixture thereof, either alone, or in mixtures with any of the other materials described for this purpose. Aramids (e.g., Kevlar® fibers) and imide fibers (e.g. Kapton®) are also attractive in this application. Since it is intended that the second functional materials will remain in the multifunctional surfacing film after curing and during ultimate use, the physical integrity or woven nature of these sheets is less critical than those of the peelable materials; i.e., they do not need to withstand a peeling operation.

The functional materials may also comprise ceramic or glass fibers—e.g., oxides, carbides, nitrides, oxycarbides, oxynitrides, carbonitrides, or oxycarbonitrides comprising aluminum, boron, silicon, and/or titanium—cermet fibers, carbon, or metallic fibers—e.g., comprising aluminum, copper, iron, silver, tin, or zinc, or mixtures, alloys—or coated hybrids comprising these materials. Exemplary materials include fibers or whiskers of alumina, aramid, boron, carbon, glass, silicon carbide, aluminum nitride, coated hybrids or mixtures thereof, preferably glass, carbon or metal-coated fibers. As used herein, the term "fibers" includes those of macro, micro, or nanodimensions, and include wires through elongated single crystals also known as whiskers. In some cases, these materials are composites of the various material classes, for example, including carbon coated metals, glass, or polymers; metal coated polymers, carbon, or glass; polymer coated glass, carbon, or metals, etc. In some cases, the functional materials are electrically conductive. In some embodiments, the functional materials impart a magnetic character to the surfacing film.

In specific embodiments within this more general description, the composite structure comprises an adhered thermoset(ting) surfacing film that is a multi-functional solid-form composite material comprising two or more of (a) a first peelable fabric, weave, mesh, or porous sheet disposed at or beneath the second surface;

(b) at least one electrically conductive material, suitable to use in lightning strike protection, electric current dissipation, EMI shielding, or heat transfer applications;

(c) at least one particulate filler or additive comprising nano-, micro-, and/or macro-dimensioned powders, particles, beads, flakes, whiskers, or fibers, wherein the wherein the at least one particulate filler or additive comprises a ceramic, polymer, glass, or metal/metalloid material or alloy thereof, for example including a carbide, nitride, or oxide of aluminum, boron, silicon, tin, zirconium, or aluminum, carbon, copper, nickel, Sn—Zn, or stainless steel, or aramid; and optionally (d) a UV resistant polymer or UV stabilizing additive, as are known in the art.

Physical Characteristics of the Composite Structures

The composite structures disclosed herein may also be characterized by one or more of their physical attributes, for example, by the strength of the direct bonding of the thermoplastic and thermoset(ting) materials.

For example, in some embodiments, the composite structures are characterized by their wettability, both as prepared and after aging. In some embodiments, the sealed surfaces exhibit a contact angle with HPLC grade water in a range of from 50° to 60°, from 60° to 70°, from 70° to 80°, or in a range of any two or more of the foregoing ranges, either or both as prepared or after aging 8 months, under conditions described in Example 3. In other embodiments, the contact angle after such aging is at least 80%, 90%, 95%, or higher of the contact angle of the originally prepared sample.

For example, in some embodiments, the composite structures further comprising an adhesive or paint are characterized by the strength of the adhesion to the thermoplastic substrate, via the chemical sealant, as measured by use of a standard cross-hatch tape test, as in the 450 cross-hatched tape test according to ASTM D3359-09. In some of these independent embodiments, the paint or adhesive exhibits a score of at least 3B, 4B, or 5B on the test. Additional details of this test are provided in the Examples.

In certain other embodiments, wherein the composite structure further comprises an adhesive, the bond may be characterized as exhibiting a fracture toughness $G_{1C}$ value of at least 100, 200, 300, 400, 500, 600, 700, 800, 900, or 1000 $J/m^2$ up to about 1500 $J/m^2$, when measured using the Double Cantilever Beam test according to ASTM D5528.

In certain other embodiments, wherein the composite structure further comprises a surfacing film, the surfacing film is adhered to the thermoplastic substrate at a strength sufficient to score at least a 3B, 4B, or 5B for a 45° cross-hatched tape test according to ASTM D3359-09, the conditions of which are described more fully in the Examples.

Methods of Making the Composite Structures

To this point, this disclosure has described the composite structures, but the disclosure also embraces the methods of making these structures. Alternative embodiments include those structures derived or derivable from the following methods, even if different than described in terms of the specifically disclosed composite structures.

As described herein, the present disclosure includes those methods of preparing a composite structure, the method comprising:

(a) exposing a surface of a thermoplastic substrate to actinic radiation and/or plasma sufficient to activate the surface of the thermoplastic substrate;

(b) applying a chemical sealant to the activated surface of the thermoplastic substrate to form a chemically sealed thermoplastic substrate having a surface of the chemical sealant; and (c) optionally heating the chemically sealed thermoplastic substrate.

In some embodiments, the methods further comprise heating the chemically sealed thermoplastic substrate. In still other embodiments, the chemical sealant is cured to the thermoplastic substrate at a temperature ranging from ambient (e.g., 25-25° C.) to 150° C. for a time sufficient to remove any volatile solvents from which the chemical sealant and/or force a chemical reaction between at least one of the chemical moieties of the chemical sealant and the activated thermoplastic surface.

These embodiments include those methods employing any of the thermoplastic substrates and surfacing films described elsewhere herein.

These embodiments also include the use of actinic radiation as described elsewhere herein. For the sake of completeness, these are reiterated here, in part, as including wherein the actinic radiation is applied at an intensity sufficient at one or more wavelengths in a range of from about 10 nm to about 450 nm, preferably in a range of from about 200 nm to about 350 nm. Suitable sub-ranges are described elsewhere herein. Similarly, the actinic radiation may be applied at one or more wavelengths at an energy in a range from about 0.5 J/$cm^2$ to about 300 J/$cm^2$ at the at least one wavelength preferably in the range from about 0.5 J/$cm^2$ to about 250 J/$cm^2$, or from about 1.5 J/$cm^2$ to about 250 J/$cm^2$ at the at least one wavelength, or any one or more of the additional embodied ranges set forth herein.

Further, the actinic radiation may be applied at a rate in one or more ranges of from about 2 mW/$cm^2$ to about 3000 mW/$cm^2$, from about 2 mW/$cm^2$ to about 2000 mW/$cm^2$, from about 300 mW/$cm^2$ to about 600 mW/$cm^2$, or preferably from about 40 to 500 mW/$cm^2$ for times ranging from about 2 to about 600 sec or from about 10 to about 60 sec. In certain other embodiments, the actinic radiation may be applied at one or more wavelengths at a rate described by one or more ranges of from about 2 to about 5 mW/$cm^2$, from about 5 to about 10 mW/$cm^2$, from about 10 to about 25 mW/$cm^2$, from about 25 to about 50 mW/$cm^2$, from about 50 to about 100 mW/$cm^2$, from about 100 to about 200 mW/$cm^2$, from about 200 to about 300 mW/$cm^2$, from about 300 to about 400 mW/$cm^2$, from about 400 to about 500 mW/$cm^2$, from about 500 to about 600 mW/$cm^2$, from about 600 to about 700 mW/$cm^2$, from about 700 to about 800 mW/$cm^2$, from about 800 to about 900 mW/$cm^2$ from about 900 to about 1000 mW/$cm^2$, from about 1000 to about 2000 mW/$cm^2$, from about 2000 to about 3000 mW/$cm^2$. In some embodiments, the range is from about 2 to 2000 mW/$cm^2$, or preferably from about 40 to 500 mW/$cm^2$.

It will be appreciated that the time needed to deliver these energies depends on the nature of the substrates and the rate at which the energy is delivered to the substrate. Faster activation may be desirable for a continuously moving production line, for example where successive substrates are passed by a light source to activate them. The duration of the exposure may be from about 0.1 seconds to about 360 minutes, such as from about 0.5 seconds to about 180 minutes or from about 0.5 seconds to about 30 minutes or from about 3 seconds to about 19 minutes or less than about 240 seconds. From the vantage of throughput, it is preferred that the duration of the exposure is from about 0.1 seconds to about 360 minutes.

Additionally, or alternatively, the actinic radiation may be applied at one or more wavelengths at one or more of the preceding rates for a time defined by one or more ranges of from about 2 to about 5 sec, from about 5 to about 10 sec, from about 10 to about 20 sec, from about 20 to about 30 sec, from about 30 to about 40 sec, from about 40 to about 60 sec, from about 60 to about 80 sec, from about 80 to about 100 sec, from about 100 to about 200 sec, from about 200 to about 300 sec, from about 300 to about 400 sec, from about 400 to about 500 sec, from about 500 to about 600 sec, or even longer to about 20 minutes, to about 60 minutes, or to about 360 minutes.

The energy required to prepare any individual thermoplastic-thermoset bonding pair depends on the nature of the materials being bonded and the time available for such actinic activation. Good results have been achieved, and are believed to be generally available after treatments using treatments of:

UV-A (320-390 nm)–200 mW/$cm^2$×30 sec=6000mJ/$cm^2$=6 J/$cm^2$

UV-B (280-320 nm)–306 mW/$cm^2$×30 sec=9180mJ/$cm^2$=9.2 J/$cm^2$

UV-C (100-260 nm)–70 mW/$cm^2$×30 sec=2100mJ/$cm^2$=2.1 J/$cm^2$

UV-V (395-445 nm)–200 mW/$cm^2$×30 sec=6 J/$cm^2$ suggesting that ranges of the following are suitable, either individually or collectively, at least for the materials tested, if not more generally:

UV-A (320-390 nm)–100-400 mW/$cm^2$×10-120 sec=1 to48 J/$cm^2$

UV-B (280-320 nm)–10-300 mW/$cm^2$×10-120 sec=0.1 to36 J/$cm^2$

UV-C (100-260 nm)–5-200 mW/$cm^2$×10-120 sec=0.5 to 24 J/$cm^2$

UV-V (395-445 nm)–50-400 mW/$cm^2$×10-120 sec=0.5 to48 J/$cm^2$

The irradiation using each of these ranges independently is considered an independent embodiment.

In all aspects of the invention where actinic radiation is referred to the actinic radiation is from a light source intentionally and/or specifically arranged to irradiate the substrate to be bonded. In some examples, the source is within 1 meter of the substrate, for example within 30 cm thereof. To be clear, the irradiation by the actinic radiation from such a light source is not intended to include, and in some embodiments specifically excludes, the use of ambient light such as natural light, light from overhead lights etc.

As recognized by persons of ordinary skill in the art, the gas plasma used in such applications comprises energized forms of any number of gases or mixtures of gases, for example, air, oxygen, nitrogen, carbon dioxide, a gas molecule containing one or more oxygen atoms, hydrogen, nitrogen, carbon tetrafluoride, sulfur hexafluoride, argon, helium, and mixture thereof, and these compositions are embraced by embodiments of the present disclosure. Plasmas comprising oxygen (including air) are preferred. These gases are energized to plasmas by applying oscillating electric field, typically having frequencies ranging, for example, from extremely low frequency such as 50 to 60 Hz, to high radio frequencies from 40 KHz to 13.5 MHz, or even to microwave frequency such as 2 to 4 GHz. In the present disclosure, DC arc plasmas are preferred, having frequencies in a range defined by one or more of 1 kHz to 5 kHz, from 5 kHz to 10 kHz, from 10 kHz to 15 kHz, from 15 kHz to 20 kHz, from 20 kHz to 25 kHz, from 25 kHz to 30 kHz, from 30 kHz to 35 kHz, from 35 kHz to 40 kHz, from 40 kHz to 45 kHz, or from 45 kHz to 50 kHz. In aerospace applications, such as contemplated here, the plasma is directed to have a power in a range of from 30 W to 600 W, though in independent embodiments, the plasma power can be defined in terms of any two or more decade increments (i.e., a "decade increment" defined as a range of 10 W) within this range, for example from 50 W to 300 W or from 100 to 600 W). The plasma may be impinged on the surface of the substrate under a pressure in a range of from 0.13 mbar to 50 bar (0.013 KPa to 5 MPa), but again, in independent embodiments, the range can be defined in terms of any two or more unit millibar increment within this range, for example, from 1 mbar to 1 bar (1000 mbar) or from 1 bar to 5 bar.

The methods described herein do not require the incorporation of an activator within the thermoplastic substrate. Nor do these methods require any of treatments that otherwise create a physical change to the surface which facilitates better adhesion such as chemical etching (e.g., acid etching), or physical abrasion (e.g., sand/grit blasting) or other treatment (e.g., flame treatment, etc.).

Unless otherwise stated, the surface of a thermoplastic substrate is irradiated and/or plasma treated in otherwise ambient temperatures and conditions, but in some embodiments, the irradiating and/or plasma treating is done at super-ambient temperatures (e.g., in one or more ranges of from 20° C. to 25° C., from 25° C. to 30° C., from 30° C. to 40° C., from 40° C. to 50° C., or from 50° C. to 60° C.). Additionally, or alternatively, in separate embodiments, the irradiating may be done in the absence of oxygen, in vacuum conditions, in ambient air, or in oxygen-rich environments. The surfaces may be UV-irradiated and plasma treated at the same time or sequentially, or a cycle of both simultaneous and sequential treatments.

The irradiating and/or plasma treating may be done either over the entire surface of the thermoplastic substrate or over a patterned section. For example, these activations may be applied selectively to create areas of the surface that are activated for subsequent bonding and areas of the surface that are not activated for subsequent bonding. A mask may be used which has areas which transmit actinic radiation/plasma to create areas of the surface that are activated for subsequent bonding areas and areas which block actinic radiation/plasma to create areas of the surface that are not activated for subsequent bonding. Small areas or large areas can be treated with different equipment (spot radiation source(s) to a large array of radiation sources) depending on need. Only the area to be bonded need be exposed to the radiation. If done in a patterned or spotted manner, the surfacing film will adhere substantially only to those activated sections, or substantially more than to non-activated sections.

Without intending to be bound by the correctness of any particular theory, it is possible that the actinic irradiation and/or the plasma activates the thermoplastic surface by rupturing at least some of these heteroatom linkages, thereby providing activated pendant —OH, —SH, —C(O)H, —C(O)OH, or —C(O)—NH moieties, that when presented with reactive groups in the surfacing films form cross-polymer linkages.

Once the thermoplastic surface is activated, the chemical sealant is applied, optionally with heat and/or with pressure, before the surface becomes passivated on standing. Subsequent materials (e.g., adhesives, paints, and surfacing films) can be conventionally applied. In the case of the surfacing films, once the thermoplastic surface is activated, the surfacing film is applied with pressure and optionally heat. In certain embodiments, the pressure applied is one or more pressures in a range of from about 0.05 MPa to 1.2 MPa, or in one or more ranges of from 0.05 MPa to 0.1 MPa, from 0.1 MPa to 0.2 MPa, from 0.2 MPa to 0.3 MPa, from 0.3 MPa to 0.4 MPa, from 0.4 MPa to 0.5 MPa, from 0.5 MPa to 0.6 MPa, from 0.6 MPa to 0.7 MPa, from 0.7 MPa to 0.8 MPa, from 0.8 MPa to 0.9 MPa, from 0.9 MPa to 1.0 MPa, from 1.0 MPa to 1.1 MPa, from 1.1 MPa to 1.2 MPa, or a combination of two or more of the foregoing ranges, for example from 0.4 MPa to 0.8 MPa, or from 0.6 MPa to 0.7 MPa. The pressures may be applied for times ranging from 30 min to 60 min, from 60 min to 90 min, from 90 min to 120 min, from 120 min to 180 min, from 180 min to 240 min, or longer. In certain embodiments, the composite structure of the thermoplastic substrate and the thermoset (ting) surfacing film are heated during this pressure treatment. In other embodiments, no external heat is applied, but when applied, the temperature of the structure is heated to one or more temperatures in a range of from 150° C. to 160° C., from 160° C. to 170° C., from 170° C. to 180° C., from 180° C. to 190° C., from 190° C. to 200° C., for example from 170° C. to 180° C. In independent embodiments, the heat is applied for some or all of the times described, either statically or at a ramping rate, such as described in the Examples.

Once bonded, the bond-strength between the thermoplastic substrate and the respective coatings are consistent with the bonding metrics described elsewhere herein.

Articles Incorporating these Composite Structures

In addition to the composite structures and the methods of making them, the present disclosure contemplates all articles comprising the composite structures disclosed herein. The composite structures are suited for articles of any size but are especially attractive for large structures. Structures contemplated include those which may be one of more of any of a primary structure element, secondary structure element, exterior element, interior element and parts forming those elements in commercial and personal aircraft and aerospace applications, motor vehicles, watercraft (including ships), railroad cars and tankers and storage tanks That is, those aircraft components comprising any of the composite structure described herein are considered within the scope of the present disclosure. These include, but are not limited to aircraft tails, wings, fuselages, or propellers, and corresponding features of other winged or wingless air or space vehicles.

Further, those components of land-based vehicles, such as automobiles, bicycles, motorcycles, trucks, or watercraft comprising any composite structure described herein are also considered within the scope of the present disclosure. These include, but are not limited to hoods, fenders, bumpers, hulls, or frames.

Terms

In the present disclosure the singular forms "a," "an," and "the" include the plural reference, and reference to a numerical value includes at least that value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the disclosure which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is another embodiment. Conversely, various features of the disclosure that are, for brevity, described in the context of a single embodiment, may also be provided separately or in any sub-combination. Finally, while an embodiment may be described as part of a series of steps or part of a more general structure, each said step may also be considered an independent embodiment, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of" For those embodiments provided in terms of "consisting essentially of," the basic and novel characteristic(s) is the facile operability of the methods or compositions/systems to provide the composite structures described herein or associated with the specific composition or method step.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments, as well as $C_{1-3}$.

Use of parentheticals or brackets to describe materials, such as (meth)acrylic or [meth]acrylic] or (pre)polymers, is intended to connote the absence or presence of the parenthetical or bracketed term or phrase. The term "(meth) acrylic," for example, refers to one or both of acrylic and methacrylic. The term "(pre)polymer," then, refers to one or both of polymer or prepolymer (the latter comprising monomers or oligomers, or even non-crosslinked polymers, depending on the nature of the organic components).

Throughout this specification, words are to be afforded their normal meaning, as would be understood by those skilled in the relevant art. However, to avoid misunderstanding, the meanings of certain terms will be specifically defined or clarified.

The term "actinic radiation" refers to a wavelength of electromagnetic radiation that can produce a photochemical reaction, including the ability of incident actinic irradiation to activate a thermoplastic composition or surface. In various embodiments of the present disclosure, in addition to the specific ranges recited elsewhere herein, the term "actinic radiation" also includes light or radiation with at least one wavelength characterized as UV-A (about 315-400 nm, or 320-390 nm) and UV-B (280-315 nm, or 280-320 nm). In other embodiments, the actinic radiation includes light or radiation with at least one wavelength characterized as UV-C (about 100-280 nm), UV-V (395-445 nm), near ultraviolet (NUV; 300-400 nm), middle ultraviolet (MUV; 200-300 nm), far ultraviolet (FUV; 122-200 nm), vacuum ultraviolet (VUV; 10-200 nm), or extreme ultraviolet (EUV; 10-120 nm).

In the context of the present disclosure, the term "carboxy acid moiety" refers to a pendant carboxylic acid, —C(O)OH, group. Likewise, the terms carboxy ester, carboxy anhydride, amide or lactam moieties refer respectively to the corresponding functional groups, i.e., —C(O)OR, —C(O)—O—C(O)-R, $—C(O)N(R')_2$, respectively, where R is alkyl or aryl, and R' is independently H, alkyl, or aryl.

In the context of the present disclosure, the term "composite structure" refers to the layered structure arising from the direct bonding between the thermoplastic substrate and the thermoset(ting) surfacing film. Recognizing that both the thermoplastic substrates and the thermoset(ting) surfacing films themselves both also may be considered composites in the true sense of that term—i.e., a polymer or prepolymer matrix comprising additives, fillers, fibers, etc.—these are referred to herein as either composite thermoplastic substrates or composite surfacing films, if the term "composite" is used as all in these contexts.

The term "chemical sealant," as used herein, refers to one or more chemical materials comprising a mono-di-, or polyfunctional organic, inorganic, or organometallic compound, which when bonded to the surface of the thermoplastic substrate, presents a pendant (such as alkyl or aryl) or functional group capable of promoting the adhesion of paint, adhesive, or surfacing film thereto or which actually has bonded to the paint, adhesive, or surfacing film, thereby forming a bonding link (for example, a covalent chemical link) between the thermoplastic substrate and the paint, adhesive, or surfacing film. Various examples of such chemical entities are described elsewhere herein.

The term "cured," as is conventionally understood, refers to a chemical process that produces the toughening or hardening of a polymer material by cross-linking of polymer chains. It is strongly associated with the production of thermoset(ting) polymers. Curing can be affected by heat, radiation, electron beams, or chemical additives. As used herein, the term "partially cured" refers to any increase in degree of crosslinking, relative to that of the original polymer or prepolymer material.

"Optional" or "optionally" means that the subsequently described circumstance may or may not occur, so that the description includes instances where the circumstance occurs and instances where it does not.

The terms "method(s)" and "process(es)" are considered interchangeable within this disclosure.

The terms "photolysis," "photolytic," or the like refers to a controlled activation of the thermoplastic surface by the used of UV light, during which certain chemical bonds are broken, typically chemical bonds comprising heteroatoms, thereby generating functional groups that renders the surface more chemically active than the untreated surface. These more chemically active functional groups can or do bond with the thermosetting surfacing film during the cure of the surfacing film.

The term "plasma" as used herein refers to an energized gas phase, typically comprising ionized atoms or molecules, more typically oxygen atoms or molecules. Plasmas typically contain energized atoms, molecules, ions, electrons, free radicals, and photons in the short wave ultraviolet (vacuum UV, or VUV for short) range, which can interact with the thermoplastic surface. If the gas used is oxygen, the plasma can be used to break certain chemical bonds, both cleaning the surface of a substrate (in this case, the thermoplastic substrate, as well we making the surface activated to the further treatments described herein. Additional descriptions of this term are set forth elsewhere herein.

The term "resin" as used herein carries its conventional meaning of a liquid, typically viscous or highly viscous material, that convert to solid materials on curing.

The term "surfacing film" is one well known in the art of aerospace engineering as referring to solid form composite materials, typically having an areal weight of less than 0.150 pound per square foot and a total thickness in a range of from 25 to 12,500 microns (1 to 500 mils). They are typically applied to aircraft substrate surfaces to provide surface qualities required for aerospace applications. In certain embodiments, reference to a surfacing film connotes such a composite material in one or more organic, inorganic, or metallic additives which are incorporated into a polymer or pre-polymer matrix, for example additives such as flow agent, rheology modifiers, density modifiers, preservatives, pigment, colorant, and the like. In other embodiments, the surfacing film may additionally or alternatively comprise one or more organic, inorganic, or metallic fibers, meshes, fabrics, or porous sheets contained within a thermoset(ting) resin. In an epoxy-based thermoset(ting) surfacing film, the thermoset(ting) resin comprises an epoxy-based resin. The surfacing film can optionally be mono-functional (e.g., containing electrically conductive metal filaments or fibers) or multi-functional (as in our previous applications).]

The term "thermoplastic" as used herein is a plastic polymer material that becomes pliable or moldable at a certain elevated temperature and solidifies upon cooling. The thermoplastics considered within this disclosure, such as are used in aerospace applications typically undergo such transformations at elevated temperatures. Specific types of materials embraced by this label are disclosed elsewhere herein and include, but are not limited to polymers of (meth)acrylics, acrylonitrile (including acrylonitrile butadiene styrene), ethylene vinyl alcohol (EVOH), ethylene-vinyl acetate (EVA), polyamides, polyamide-imide (PAI), polyaryletherketone (PAEK), polybenzimidazole, polycarbonate, polylactic acid (polylactide), polyether sulfone, polyoxymethylene (also known as acetal), polyetherether ketone, polyetherimide, polyetheretherketone (PEEK), polyetherimide (PEI), polyetherketoneketone (PEKK), polyethersulfone (PES), polyethylene, polyhydroxyalkanoates polyimide, polyketone, polyphenylene oxide, polyphenylene sulfide, polysulfone, polypropylene, polystyrene, polytetrafluoroethylene, polyurethane, polyvinyl chloride, and polyvinylidene fluoride.

The terms "thermosetting" or "thermosettable" are used herein in their conventional sense to refer to polymers or prepolymers or resins that become or are irreversibly hardened (i.e., "thermoset") by cross-linking networks during curing. Crosslinked (meth)acrylics, (meth)acrylamides, benzoxazines, a bismaleimides, cyanoacrylates, epoxies, epoxyacrylates, polyamides, polyimides, polyurethanes, triazine polymers, vinyl esters, phenolic, amino and furan resins, or copolymers or mixtures thereof are non-limiting examples of these types of materials.

As convention in the industry, either of the terms "thermoset" or "thermoset(ting)" may be used broadly to describe the nature of the polymer or surfacing film, regardless of the degree of cure. The term "thermoset(ting)" embraces both partially or fully cured (thermoset) and uncured or lesser cured (thermosetting or thermosettable) materials. Clearly, the degree of curing is a spectrum for any material, but a person of skill in the art would be able to distinguish the meaning of these terms in the context of their use.

A "thermosetting or thermosettable surfacing film" or "thermoset(ting) film" a solid-form composite material, comprising the respectively cited polymer or prepolymer. Such surfacing films comprise polymers and/or prepolymers and one or more organic, inorganic, or metallic additives which are incorporated into a polymer or pre-polymer matrix, for example additives such as flow agent, rheology modifiers, density modifiers, preservatives, pigment, colorant, and the like. These surfacing films may also optionally comprise one or more organic, inorganic, or metallic fibers, meshes, fabrics, or porous sheets contained within or on one surface of the polymer or pre-polymer matrix. In an epoxy-based thermoset surfacing film, the thermoset resin comprises an epoxy-based resin. The surfacing film can optionally be mono-functional (e.g., containing electrically conductive metal filaments or fibers) or multi-functional (as described elsewhere herein). It is to be understood that the terms "thermosetting or thermosettable surfacing film" and "thermoset surfacing film" refer to a surfacing film composition with different degrees of curing. For the sake of clarity, it should be appreciated that these terms should be considered in the context in which they arise.

The following listing of Embodiments is intended to complement, rather than displace or supersede, the previous descriptions.

Embodiment 1. A composite structure comprising a thermoplastic substrate comprising a chemical sealant direct bonded to a surface thereof. In certain Aspects of this Embodiment, the direct bonding defines an interface between a thermoplastic surface of the thermoplastic substrate and a first surface of chemical sealant coating layer, the chemical sealant coating layer further comprising a second surface opposite the first surface the chemical sealant coating layer.

Unless otherwise specified, the thermoplastic surface is the same as or chemically consistent with the thermoplastic substrate, where the term "chemically consistent with" means that the polymer building blocks of the substrate and surface are the same, even if some of the bonding sites of the surfaces have been altered by photolytic activation.

In some Aspects of this Embodiment, the composite structures exhibit wettability, both as prepared and after aging, as described elsewhere herein. For example, in some Aspects the sealed surfaces exhibit a contact angle with HPLC grade water in a range of from 50° to 80°, either or both as prepared or after aging 8 months, and/or the contact angle after such aging is at least 80% of the contact angle of the originally prepared sample. Additional Aspects of these ranges are described elsewhere herein.

Embodiment 2. The composite structure of Embodiment 1, wherein the thermoplastic substrate independently comprises:

(a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
(b) a polymer containing a phenyl group directly attached to a carbonyl group, optionally wherein the carbonyl group is part of an amide group, such as polyarylamide (PARA);
(c) a polyphenylene sulfide (PPS);
(d) a polyphenylene oxide (PPO); or
(e) a polyetherimide (PEI).

Embodiment 3. The composite structure of Embodiment 1 or 2, wherein the thermoplastic substrate comprises a thermoplastic polymer whose linkages are susceptible to at least partial photolytic cleavage upon irradiation by actinic radiation of sufficient intensity wherein the actinic radiation includes radiation with at least one wavelength in the range from about 10 nm to about 500 nm or about 100 nm to about 450 nm, preferably in a range of from about 200 nm to about 350 nm. Additional Aspects of this Embodiment include the sub-ranges of these ranges described elsewhere herein.

Embodiment 4. The composite structure of any one of Embodiments 1 to 3, wherein the thermoplastic substrate comprises a thermoplastic polymer whose linkages are susceptible to at least partial photolytic cleavage upon irradiation by at least one wavelength (optionally 1, 2, 3, or 4 wavelengths) of actinic radiation at an energy in a range from about 0.1 $J/cm^2$ to about 300 $J/cm^2$ at the at least one wavelength preferably in the range from about 0.5 $J/cm^2$ to about 250 $J/cm^2$, or from about 1.5 $J/cm^2$ to about 250 $J/cm^2$ at the at least one wavelength. Additional Aspects of this Embodiment include the sub-ranges of these ranges described elsewhere herein.

Embodiment 5. The composite structure of any one of Embodiments 1 to 4, wherein the chemical sealant is directly bonded to a patterned portion of the thermoplastic substrate. Independent exemplars of this chemical group are described elsewhere herein.

Embodiment 6. The composite structure of any one of Embodiments 1 to 5, wherein the chemical sealant is or comprises an organic or organometallic compound having one, two, or more epoxy or oxetane moieties. Independent exemplars of this chemical group are described elsewhere herein.

Embodiment 7. The composite structure of any one of Embodiments 1 to 6, wherein the chemical sealant is or comprises an organic or organometallic compound having one, two, or more glycidyl ether moieties. Independent exemplars of this chemical group are described elsewhere herein.

Embodiment 8. The composite structure of any one of Embodiments 1 to 7, wherein the chemical sealant is or comprises an organic or organometallic compound having one, two or more carboxy acid, carboxy ester, carboxy anhydride, amide or lactam moieties. Independent exemplars of this chemical group are described elsewhere herein.

Embodiment 9. The composite structure of any one of Embodiments 1 to 8, wherein the chemical sealant is or comprises an organic or organometallic compound having one, two or more hydroxyphosphate moieties. Independent exemplars of this chemical group are described elsewhere herein.

Embodiment 10. The composite structure of any one of Embodiments 1 to 9, wherein the chemical sealant is or comprises an organic or organometallic compound having one, two or more —OH, —SH, or —NH moieties. Independent exemplars of this chemical group are described elsewhere herein.

Embodiment 11. The composite structure of any one of Embodiments 1 to 10, wherein the chemical sealant is or comprises an organic or organometallic compound having one, two, or more silanol, alkoxysilanol, or alkoxy silane moieties. Independent exemplars of this chemical group are described elsewhere herein.

Embodiment 12. The composite structure of any one of Embodiments 1 to 11, wherein the chemical sealant is or comprises an organic or organometallic compound having one, two, or more isocyanate moieties. Independent exemplars of this chemical group are described elsewhere herein.

Embodiment 13. The composite structure of any one of Embodiments 1 to 12, wherein the chemical sealant is or comprises an organic or organometallic compound having one, two, or more alkoxytitanate or alkoxyzirconate moieties. Independent exemplars of this chemical group are described elsewhere herein.

Embodiment 14. The composite structure of any one of Embodiments 1 to 13, further comprising an adhesive, paint (primer, intermediate, or topcoat layer), or surfacing film layer, wherein the sealant is disposed between and is bonded to both the thermoplastic substrate and the adhesive, paint, primer, or surfacing film layer, the adhesive, paint, or surfacing film layer characterized as having a first surface bonded to the sealant and a second surface opposite the first surface.

Embodiment 15. The composite structure of Embodiment 14, wherein the adhesive, paint, or surfacing film layer comprises a thermoplastic or thermoset(ting) polymer.

Embodiment 16. The composite structure of Embodiment 14 or 15, wherein the adhesive, paint, primer, or surfacing film layer comprises a benzoxazine, a bismaleimide, a cyanoacrylate, an epoxy, an epoxy-acrylate, a (meth)acrylate, a (meth)acrylamide, a polyamide, a polyester, a polyimide, a polyurethane, a triazine, a vinyl ester, or a copolymer or mixture thereof, preferably a (meth)acrylate, epoxy, or polyurethane polymer.

Embodiment 17. The composite structure of any one of Embodiments 14 to 16, wherein the adhesive, paint, or surfacing film layer is applied but not yet cured (i.e. cross-linked) or solidified (in the case where a paint does not cross-link but is still a complete film).

Embodiment 18. The composite structure of any one of Embodiments 14 to 16, wherein the adhesive, paint, or surfacing film layer is cured or fully solidified.

Embodiment 19. The composite structure of any one of Embodiments 14 to 18, wherein the adhesive or paint is sufficiently adhered to the composite structure to exhibit a score of at least 3B, 4B, or 5B using a standard 450 cross-hatch tape test according to ASTM D3359-09, the conditions of which are described more fully in the Examples.

Embodiment 20. The composite structure of any one of Embodiments 14 to 18, wherein the thermoset(ting) surfacing film is an epoxy-based thermoset(ting) surfacing film.

Embodiment 21. The composite structure of any one of Embodiments 14 to 18 or 20, wherein the surfacing film is itself a solid-form composite material comprising one or more organic or inorganic fibers, fabrics, weaves, meshes, or porous sheets contained within a thermoplastic or thermoset (ting) polymer.

Embodiment 22. The composite structure of any one of Embodiments 14 to 18, 20, or 21, wherein the surfacing film is a solid-form composite material comprising one or more peelable organic or inorganic fabrics, weaves, meshes, or porous sheets disposed at or beneath the second surface of the surfacing film.

Embodiment 23. The composite structure of any one of Embodiments 14 to 18 or 20 to 22, wherein the surfacing film is a solid-form composite material comprising one or more organic or inorganic fabrics, weaves, meshes, or porous sheets contained within a thermoset(ting) resin, and further comprises at least one electrically conductive material, suitable to use in lightning strike protection, electric current dissipation, EMI shielding, or heat transfer applications.

Embodiment 24. The composite structure of any one of Embodiments 14 to 18 or 20 to 23, wherein the surfacing film is a solid-form composite material comprising one or more organic or inorganic fabrics, weaves, meshes, or porous sheets, and further comprises at least one particulate material suitable to use as an impact modifier contained within the thermoplastic or thermoset(ting) polymer.

Embodiment 25. The composite structure of any one of Embodiments 14 to 18 or 20 to 24, wherein the surfacing film is adhered to the thermoplastic substrate at a strength sufficient to exhibit a score of at least 3B, 4B, or 5B using a standard 45° cross-hatch tape test according to ASTM D3359-09, the conditions of which are described more fully in the Examples.

Embodiment 26. The composite structure of any one of Embodiments 14 to 18 or 20 to 24, wherein the second surface of the surfacing film is coated with paint.

Embodiment 27. A method of preparing a composite structure, the method comprising:

(a) exposing a surface of a thermoplastic substrate to actinic radiation and/or plasma sufficient to activate the surface of the thermoplastic substrate;

(b) applying a chemical sealant to the activated surface of the thermoplastic substrate to form a chemically sealed thermoplastic substrate having a surface of the chemical sealant; and (c) optionally heating the chemically sealed thermoplastic substrate.

In certain independent Aspects of this Embodiment, the irradiating is done at ambient or super-ambient temperatures and conditions, in the absence of oxygen, under vacuum conditions, in ambient air, or in oxygen-rich environments, as set forth elsewhere herein.

In certain independent Aspects of this Embodiment, the irradiating or plasma treatment is done under any one or more of the conditions set forth elsewhere herein.

Embodiment 28. The method of Embodiment 27, further comprising heating the chemically sealed thermoplastic substrate.

Embodiment 29. The method of Embodiments 27 or 28, wherein the thermoplastic substrate comprises:

(a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);

(b) a polymer containing a phenyl group directly attached to a carbonyl group, optionally wherein the carbonyl group is part of an amide group, such as polyarylamide (PARA);

(c) a polyphenylene sulfide (PPS);

(d) a polyphenylene oxide (PPO); or (e) a polyetherimide (PEI).

Embodiment 30. The method of any one of Embodiments 27 to 29, wherein the surfacing film is an epoxy-based thermosetting or thermosettable surfacing film surfacing film, and the corresponding thermoset surfacing film is an epoxy-based thermoset surfacing film.

Embodiment 31. The method of any one of Embodiments 27 to 30, wherein the actinic radiation is applied at an intensity sufficient at one or more wavelengths in a range of from about 10 nm to about 450 nm, preferably in a range of from about 200 nm to about 350 nm. Additional Aspects of this Embodiment include the sub-ranges of these ranges described elsewhere herein.

Embodiment 32. The method of any one of Embodiments 27 to 31, wherein the actinic radiation is applied at one or more wavelengths at an energy in a range from about 0.5 $J/cm^2$ to about 300 $J/cm^2$ at the at least one wavelength preferably in the range from about 0.5 $J/cm^2$ to about 250 $J/cm^2$, or from about 1.5 $J/cm^2$ to about 250 $J/cm^2$ at the at least one wavelength. Additional Aspects of this Embodiment include the sub-ranges of these ranges described elsewhere herein. Similarly, additional Aspects of this Embodiment include those rates and times of the application of the actinic radiation described and set forth elsewhere herein.

Embodiment 33. The method of any one of Embodiments 27 to 32, the method further comprising applying an adhesive, paint (primer, intermediate, or topcoat layer), or surfacing film to the second surface of the chemical sealant.

Embodiment 34. The method of any one of Embodiment 33, the method further comprising curing or coalescing the adhesive, paint (primer, intermediate, or topcoat layer), or surfacing film Embodiment 35. The method of any one of Embodiments 27 to 34, wherein the adhesive, paint, or surfacing film are sufficiently adhered to the thermoplastic substrate to exhibit a score of at least 3B, 4B, or 5B using a standard 45° cross-hatch tape test according to ASTM D3359-09, the conditions of which are described more fully in the Examples. Alternatively or additionally, wherein the composite structure further comprises an adhesive, the bond may be characterized as exhibiting a fracture toughness $G_{1C}$ value of at least 100, 200, 300, 400, 500, 600, 700, 800, 900, or 1000 J/m2 up to about 1500 $J/m^2$, when measured using the Double Cantilever Beam test according to ASTM D5528.

Embodiment 36. A composite structure prepared by any one of Embodiments 27 to 35.

Embodiment 37. A component of an aircraft or aerospace craft, the component comprising a composite structure of any one of Embodiments 1 to 26. In certain Aspects of this Embodiment, the aircraft component comprises an aircraft tail, wing, fuselage, or propeller.

Embodiment 38. A component or part of a land-based vehicle, such as an automobile, bicycle, motorcycle, truck, or watercraft comprising a composite structure of any one of Embodiments 1 to 26. In certain Aspects of this Embodiment, the component comprises a hood, fender, bumper, hull, or frame.

EXAMPLES

Standard Application Conditions

Under standard testing conditions, the surface of a thermoplastic substrate was cleaned using an isopropanol wipe to remove dust. Once cleaned, and where so indicated, the surface of the thermoplastic substrate was irradiated with UV light using a UVALOC 1000 source, fitted with a Mercury D-type bulb (iron doped), or plasma treated for the prescribed time and energy.

Where paints or adhesives were applied, such applications were done using convention methods (spray, brush, etc.).

Where surfacing films were applied, after which the surfacing film was overlaid on the thermoplastic surface, and the assembly was consolidated with a standard vacuum bag/autoclave process according to the following steps:

(1) An aluminum caul plate was wiped and cleaned by acetone and then a releasing agent was applied on the plate except the edges;
(2) the border of the plate was lined with vacuum putty;
(3) the parts/specimens were first laid up in advance where the one side tacky (OST) surfacing film was laid up on the thermoplastic substrate from its tacky side to make the specimens. Then the specimens were placed inside the border of the caul plate by using arrangements of film material (nylon film), the specimen, perforated Teflon film, and breather cloth.
(4) A vacuum line vent was placed on the plate and the entire assembly was covered with nylon film. The nylon film was pressed into putty to form a tight seal. Vacuum was drawn to test the quality of the seal;
(5) The whole bagged plate was put inside the autoclave;
(6) The specimens were cured under the following conditions: Temperature: 177° C. with a ramping rate of 1.7° C./min, Pressure 0.31 MPa, Time: 120 minutes.

After this consolidation, the assembly was removed, visually inspected, and the adhesion tested.

Standard Testing Conditions

The adhesion performance was evaluated with the cross-hatch test method where the test was done as follows:

(1) The specimen was scribed with a cutting tool according to FIG. 1 where cutting was done through the coating (surfacing film) to the base material. The cutting tool can be a sharp razor blade, scalpel, or knife. In this test, 45-degree crosshatch scribe was made where the angle between two sets of parallel scribes was 45±5 degrees and the parallel scribes are apart by about 3.05 mm.
(2) The masking tape (3M tape No. 250) was applied as illustrated in FIG. 1. The tape was press down firmly by using the roll of tape itself.
(3) After 1 minute of applying the tape on the panels, the tape was removed in one abrupt motion and pulling perpendicular to the panel.
(4) The tested area was visually examined and rated according to ASTM D3359-09. The cross-hatch rating ranges from 0B to 5B where 0B is the worst condition with an area removed percentage of greater than 65%. The rating classification is summarized in Table A.

TABLE A

Classification of adhesion test results

| Rating | Percent Area Removed |
|---|---|
| 5B | 0% (none removed) |
| 4B | Less than 5% |
| 3B | 5 to 15% |
| 2B | 15 to 35% |
| 1B | 35 to 65% |
| 0B | Greater than 65% |

Pretreating Thermoplastic Substrates—General Procedure: Unless otherwise specified, the standard conditions comprise wiping the surface of a thermoplastic substrate with an isopropanol wipe to remove dust. Once cleaned, and where so indicated, the surface of the thermoplastic substrate was irradiated with UV light using a UVALOC 1000 source, fitted with a Mercury D-type bulb (iron doped) for the prescribed time. Exposure times typically were to expose the substrate to UV light with a wavelength in the range of about 200 nm to about 400 nm with an energy in the range of 0.1 $J/cm^2$ to about 300 $J/cm^2$ for a time between 10 and 60 seconds.

Where so indicated, the plasma activation typically comprised applying a DC-Arc dry air plasma having a frequency with a value of 21 KHz and a Plasma power of 400 W with a gas pressure of 3.5 bar (350 KPa). The plasma had a travel speed between 2.5 mm/s and 25 mm/s. The plasma parameters were: Nozzle: 14-degree, Distance: 8-12.7 mm, pressure 3.5-50 psi. This provided Once activated, the activated surface was then treated with a chemical sealer, preferably by spraying but other application techniques, like wiping, brushing and soaking were also used. The curing of the sealer was done at room and or elevated temperature depending on the chemistry of the sealer.

Materials Used in the Examples

Thermoplastic substrate: The thermoplastic substrate used in the Examples was a thermoplastic consolidated laminate (TPCL) made of several layers of thermoplastic powdered woven fabric. The powdered woven fabric is composed of the high tenacity carbon fiber (Tenax-E HTA40 E13 3K 200 tex) and a PEEK matrix (42 wt. %). The fabric had a 5 Harness pattern with an areal weight of 285 $g/m^2$ and a total panel thickness of 1.5 mm.

Epoxy based paint primer: The primer used in the Examples was a chrome-free epoxy primer paint designed for application to composite aircraft surfaces in the aerospace industry. It was a solvent-based product and compatible with polyurethane topcoats and epoxy primers with a service temperature of −54° C. to 177° C., curable at room temperature (25° C.) for 7 days.

Silane based sealer: The silane based sealer was a silane-based organometallic, chrome-free, water-based product based on sol-gel technology. It was a two-part system and H+ catalyzed containing alkoxy silane epoxy component, curable at room temperature and high temperature 177° C. Different application methods such as spray, brush, and wiping were used.

Epoxy Cr-free sealer: The chrome-free epoxy based product was a two-part water-based system having reactants in each part combinable to form the sealer. Cure is high temperature cure (120 and 177° C.).

Loctite EA 9696 Aero: This material is an epoxy film adhesive comprising a pre-catalyzed epoxy resin cast into a film and containing modified epoxy resin, designed for high toughness and service temperature to 121° C. The film is reticulatable. It was cured from 107 to 129° C.

Painting Activated Thermoplastic Substrates—General Procedure

The paints were typically sprayed onto the chemically sealed surfaces, though other methods (brushing or rolling) were also used. Once applied, the paints were cured either at room temperature cure for several hours up to a couple of days. Elevated cure temperature 150 and 200° F. for approximately 30-60 minutes were also used. Adhesion was tested using the cross-hatch test method.

Bonding Adhesives to Thermoplastic Substrates—General Procedure:

The adhesives were typically sprayed onto the chemically sealed surfaces, though other methods (brushing or rolling) were also used. To evaluate the adhesion performance multiple test methods including floating roller peel test and potentially G1C double cantilever beam (fracture toughness) test.

Surfacing films were physically overlaid onto the chemically sealed surfaces and subjected to vacuum-heat treatments to adhere the surfacing films to the chemically sealed thermoplastic substrate. Adhesion was tested using a cross-hatch test method.

Example 1: The Effect of the Chemical Sealer on Increasing the Adhesion Between Thermoplastic Substrates and Adhesives

Example 1.1: Scope: Sealer+Adhesives

Fracture toughness ($G_{1C}$) measurement is one of the standard tests to evaluate the adhesion between adhesives and substrates. It was found that bonding a thermoplastic PEEK substrate with a thermoset substrate with some adhesives at some specific curing temperatures results in poor adhesion even with UV activation of PEEK panels (87.56) and for sure without UV activation (52.53). The adhesion to PEEK was poor and therefore the $G_{1C}$ values are very low. By contrast, the use of a chemical silane based sealer applied after UV activation of the PEEK substrate led to dramatically higher $G_{1C}$ (1085.75) values indicating a significant improvement in adhesion to the PEEK side.

Example 1.2: General Application Procedure

Trials were conducted to bond the thermoplastic composite substrate Tenax-E TPCL PEEK-HTA40 with and without UV activation, with and without chemical sealant to an epoxy-based thermoset composite skin. The adhesion was evaluated by measuring fracture toughness energy ($G_{1C}$) by Double Cantilever Beam (DCB) test, according to ASTM D5528. The sample was prepared by co-bonding of the thermoplastic substrate to thermosetting prepregs according to the following steps:

The substrate was first cleaned two times with an IPA (Isopropyl alcohol) followed by a 10 minute drying time after each wipe. The cleaned substrate was then optionally activated by UV irradiation at 290 mW/cm$^2$ for 30 seconds. The chemical silane-based organometallic sealer was then applied. The silane sealer was applied by wiping for 1 minute to keep the surface wet and then it was dried for 1 hour. Then curing was done at room temperature for 1 h. In the fourth step, the consolidation was done with a standard vacuum bag/autoclave process as described above. In the fifth step, the adhesion performance was evaluated with the Double Cantilever Beam test according to ASTM D5528.

Example 1.3. Results

Sample 1.1: The thermoplastic substrate without UV activation and silane sealer was co-bonded to the carbon fiber-reinforced epoxy skin according to the general application procedure. Fracture toughness evaluation gave a $G_{1C}$ value of 52.53 (J/m$^2$).

Sample 1.2: The thermoplastic substrate, subjected to UV activation, but without silane sealer was co-bonded to the carbon fiber-reinforced epoxy skin according to the general application procedure. Fracture toughness evaluation gave a $G_{1C}$ value of 87.56 (J/m$^2$).

Sample 1.3: The thermoplastic substrate treated with UV activation and the silane sealer was co-bonded to the carbon fiber-reinforced epoxy skin according to the general application procedure. Fracture toughness evaluation gave a $G_{1C}$ value of 1085.78 (J/m$^2$).

Example 2: The Effect of the Chemical Sealer on Increasing the Adhesion Between Thermoplastic Substrates and Paints

Example 2.1: General Application Procedure

Trials were conducted to test the adhesion of paint applied directly a chemically sealed thermoplastic composite substrate Tenax-E TPCL PEEK-HTA40 with and without UV activation by using epoxy-based paint primer (DeSoto 512X310 from PPG Aerospace coatings).

The substrate was cleaned two times with an isopropyl alcohol, and dried for 10 minutes after each wipe. Where so treated, the cleaned substrate was activated by UV irradiation at 290 mW/cm$^2$ for 30 seconds. Where so treated, the silane-based sealer and epoxy Cr-free sealer (Loctite EA 9296 NC) were applied to separate samples.

The silane sealer was applied by wiping for 1 minute to keep the surface wet and then it was dried for 1 hour. Then curing was done either at room temperature for 1 h or at elevated temperature (65.5 or 177° C.) for 30 minutes. The final dry thickness of silane sealer is 0.5-0.7 μm.

The epoxy Cr-free sealer was applied by using a spray gun (Campbell Hausfeld Detailed spray gun model #DH 5500) which is a siphon feed type gun with a fluid nozzle size of 1.8 mm. During priming, the inlet air pressure was set to about 0.34 MPa and the parts were sprayed with the gun about 15.2 cm away from the substrate surface. A Fischer Delta Isoscope Model #FMP10 was used to non-destructively measure dry primer thickness on an adjacent aluminum "witness" panel via eddy current. After 30 min drying at RT the product was cured at 177° C. for 1 h. The dry thickness was about 1 to 2.5 μm and the obtained rating presented in the table is valid for this range of thicknesses.

The primer paint was applied to the respective sealed surfaces of the thermoplastic substrate with a target thickness of 20-25 μm. The drying or curing of the paint was done according to TDS of the paint primer. For the epoxy-based primer, the primer was cured at room temperature (25° C.) for 7 days.

The samples were evaluated for their adhesive properties using the cross-hatch test method as set forth elsewhere herein.

Example 2.2: Results (See Table 1)

Sample 2.1: The epoxy-based primer was sprayed on a thermoplastic substrate that had had no UV activation or sealer applied according to the general application procedure. Cross hatch evaluation gave a rating of 0B.

Sample 2.2: The epoxy-based primer was sprayed on a thermoplastic that had been UV activated, but to which no sealer had been applied. Cross hatch evaluation gave a rating of 0B.

Sample 2.3: The epoxy-based primer was sprayed on a thermoplastic substrate that had not been UV activated, but to which the silane sealer had been applied and cured at ambient temperature (25° C.), both according to the general application procedure. Cross hatch evaluation gave a rating of 0B.

Sample 2.4: The epoxy-based primer was sprayed on a thermoplastic substrate that had been UV activated and to which the silane sealer had been applied and cured at room temperature (25° C.) according to the general application procedure. Cross hatch evaluation gave a rating of 2B.

Sample 2.5: The epoxy-based primer was sprayed on a thermoplastic substrate that had not been UV activated, but to which the silane sealer had been applied and cured at elevated temperature (65.5° C.) according to the general application procedure. Cross hatch evaluation gave a rating of 0B.

Sample 2.6: The epoxy-based primer was sprayed on a thermoplastic substrate that had been UV activated, and to which the silane sealer had been applied and cured at elevated temperature (65.5° C.) according to the general application procedure. Cross hatch evaluation gave a rating of 4B.

Sample 2.7: The epoxy-based primer was sprayed on a thermoplastic substrate that had been UV activated, and to which the silane sealer had been applied and cured at elevated temperature (177° C.) according to the general application procedure. Cross hatch evaluation gave a rating of 4B.

Sample 2.8: The epoxy-based primer was sprayed on a thermoplastic substrate that had been UV activated, and to which the silane sealer had been applied and dried at room temperature (25° C.) and cured by UV irradiation (similar condition of UV treatment) according to the general application procedure. Cross hatch evaluation gave a rating of 4B.

Sample 2.9: The epoxy-based primer was sprayed on a thermoplastic substrate that had not been UV activated, and to which the Cr-free epoxy sealer had been applied and cured at elevated temperature (177° C.) according to the general application procedure. Cross hatch evaluation gave a rating of 0B.

Sample 2.10: The epoxy-based primer was sprayed on a thermoplastic substrate that had been UV activated, and to which the Cr-free epoxy sealer had been applied and cured at elevated temperature (177° C.) according to the general application procedure. Cross hatch evaluation gave a rating of 4B.

TABLE 1

Results of testing of epoxy paint primer at various conditions. Paints were cured at ambient room temperatures, unless otherwise indicated

| Sample | UV-Activation | Sealer | Sealer Curing Temp, ° C. | Cross-hatch Test |
|---|---|---|---|---|
| 2.1 | No | No | N/A | 0B |
| 2.2 | Yes | No | N/A | 0B |
| 2.3 | No | Silane | 25° C. | 0B |
| 2.4 | Yes | Silane | 25° C. | 2B |
| 2.5 | No | Silane | 65.5° C. | 0B |
| 2.6 | Yes | Silane | 65.5° C. | 4B |
| 2.7 | Yes | Silane | 177° C. | 4B |
| 2.8 | Yes | Silane | 25° C. | 4B |
| 2.9 | No | Epoxy | 177° C. | 0B |
| 2.10 | Yes | Epoxy | 177° C. | 4B |

Example 3: The Effect of a Silane Based Sealer on Preserving UV and Plasma Activation of Thermoplastic Substrate It is a well-known problem that Plasma activation is fading over time and therefore a plasma activated substrate should be further processed (bonding/painting) in a rather short time. Trials were conducted using the methods set forth elsewhere herein. In these experiments, both adhesion and contact angles (using wettability as reflective of the activity of the surface showed that the use of chemical sealants allowed for the retention of the chemical activity over prolonged periods of time.

Example 3.1. Summary of Results

Plasma activated surfaces: The initial contact angle of an untreated PEEK substrate showed a contact angle of 64° and poor paint adhesion (0B). After plasma activation the contact angle of the substrate was around 13° and allowed for painting resulting in good adhesion (4B).

The contact angle of an activated plasma sample reverted back to its original value (58°) after aging (example 8 months) reflecting the partial or complete loss of activation. The paint adhesion of the aged specimen was also poor (1B).

In contrast to this observation, the application of a chemical silane based sealer after plasma activation provided samples in which the plasma activation was preserved over this same time period and which allowed the samples to be painted after 8 months and good paint adhesion (4B) was obtained.

UV-activated surfaces: The UV activation also led to lower contact angle (54°) and over time (example 8 months) the contact angle returned back to its original value (64°).

By contrast, samples that had been UV activated and treated with a chemical silane based sealer after UV activation had surfaces that exhibited preserved activation over time and allowed the samples to be painted after 8 months and good paint adhesion (4B) was obtained.

Example 3.2. General Application Procedure

Trials were conducted to test the effect of various parameters on the preservation of UV/Plasma activation of the thermoplastic PEEK substrate, with and without silane-based chemical sealants. For this purpose, untreated and treated PEEK substrates with and without the chemical sealants were aged to evaluate deactivation of the substrates over time and to prove preserving effect of the sealants.

To evaluate deactivation of the treated substrates by aging, the contact angle between a droplet of HPLC grade water and the substrates was measured with the Surface Analyst 3001 from BTG LABS. To examine the activation of the thermoplastic substrates after aging, crosshatch adhesion test of painted substrates was run. All experiments were conducted according to the standard procedures. Contact angles between droplets of HPLC grade water and the substrates were measured before and after the various treatment regimes. Where indicated as applied, the chemical silane-based sealer was chemical silane-based organometallic sealer. The silane sealer was applied by wiping for 1 minute to keep the surface wet and then it was dried for 1 hour. Then curing was done either at room temperature for 1 h or at elevated temperature (65.5 or 177° C.) for 30 minutes. The final dry thickness of silane sealer is 0.5-0.7 μm. A Fischer Delta Isoscope Model #FMP10 was used to non-destructively measure dry sealant thickness on an adjacent aluminium "witness" panel.

The PEEK substrates with and without the surface treatments, with and without the chemical sealants were sealed in plastic bags with an aluminum inter layer for real time aging. The sealed specimens were stored at room temperature without exposing to sun light. After 8 months aging, the contact angle between HPLC grade water droplet with the untreated and UV/Plasma treated substrates was re-measured. Also after aging, an epoxy based paint primer (Desoto 512X310 from PPG Aerospace coatings) was applied to the surface of all thermoplastic substrates (including untreated, fresh and aged UV/Plasma treated substrates) by using a spray gun (Campbell Hausfeld Detailed spray gun model #DH 5500) which is a siphon feed type gun with a fluid nozzle size of 1.8 mm. During priming, the inlet air pressure was set to about 0.34 MPa and the parts were sprayed with the gun about 15.2 cm away from the substrate surface. The target thickness of dry paint primer was about 20-25 μm. The drying or curing of the paint was done according to TDS of the paint primer which was cured at room temperature (25° C.) for 7 days. Adhesion was done using the cross-hatch method set forth elsewhere herein.

Example 3.3. Results (see Table 2)

Sample 3.1: No Treatment: Initial Contact Angle (Control)

The contact angle of the untreated PEEK substrate without the silane sealer was measured by the surface analyser according to the general application procedure. The average contact angle value was about 64 degree.

Sample 3.2: No Treatment: Contact Angle after 8 Months (Control)

The contact angle of the aged untreated PEEK substrate (without the silane sealer) was measured by the surface analyser according to the general application procedure. The average contact angle value was about 64 degree.

Sample 3.3: Plasma (non-aged): Contact Angle

The contact angle of a fresh Plasma activated PEEK substrate without the silane sealer was measured by the surface analyser according to the general application procedure. The average contact angle value was about 13 degree.

Sample 3.4: Plasma+Aging: Contact Angle

The contact angle of the aged Plasma activated PEEK substrate without the silane sealer was measured by the surface analyser according to the general application procedure. The surface energy of Plasma treated substrate was decreased after aging where the contact angle value almost reached to the value of the untreated substrate. The average contact angle value was about 58 degree.

Sample 3.5: UV (non-aged): Contact Angle

The contact angle of a fresh UV activated PEEK substrate without the silane sealer was measured by the surface analyser according to the general application procedure. The average contact angle value was about 54 degree.

Sample 3.6: UV+Aging: Contact Angle

The contact angle of the aged UV activated PEEK substrate without the silane sealer was measured by the surface analyser according to the general application procedure. The surface energy of UV treated substrate was decreased after aging where the contact angle value reached to the value of the untreated substrate. The average contact angle value was about 65 degree.

Sample 3.7: Untreated (non-aged)+Paint: Cross hatch

The epoxy based primer was sprayed on a fresh untreated thermoplastic substrate and without the silane sealer according to the general application procedure. Cross hatch evaluation gave a rating of 0B.

Sample 3.8: Untreated+Aged+Paint: Cross hatch

The epoxy based primer was sprayed on the aged untreated thermoplastic substrate and without the silane sealer according to the general application procedure. Cross hatch evaluation gave a rating of 0B.

Sample 3.9: Plasma (non-aged)+Paint: Cross hatch

The epoxy based primer was sprayed on a fresh plasma activated thermoplastic substrate but without the silane sealer according to the general application procedure. Cross hatch evaluation gave a rating of 4B.

The epoxy based primer was sprayed on the aged plasma activated thermoplastic substrate but without the silane sealer according to the general application procedure. Cross hatch evaluation gave a rating of 1B.

Sample 3.11: Plasma (non-aged)+Sealer+Paint: Cross Hatch

The epoxy based primer was sprayed on the fresh Plasma activated thermoplastic substrate with the silane sealer according to the general application procedure. Cross hatch evaluation gave a rating of 4B.

Sample 3.12: Plasma+Sealer+Aged+Paint: Cross Hatch

The epoxy based primer was sprayed on the aged Plasma activated thermoplastic substrate with the silane sealer according to the general application procedure. Cross hatch evaluation gave a rating of 4B.

Sample 3.13: UV (non-aged)+Paint: Cross Hatch

The epoxy based primer was sprayed on a fresh UV activated thermoplastic substrate but without the silane sealer according to the general application procedure. Cross hatch evaluation gave a rating of 0B.

Sample 3.14: UV+Aged+Paint: Cross Hatch

The epoxy based primer was sprayed on the aged UV activated thermoplastic substrate but without the silane sealer according to the general application procedure. Cross hatch evaluation gave a rating of 0B.

Sample 3.15: UV (non-aged)+Sealer+Paint: Cross Hatch

The epoxy based primer was sprayed on the fresh UV activated thermoplastic substrate and with the silane sealer according to the general application procedure. Cross hatch evaluation gave a rating of 4B.

Sample 3.16: UV+Sealer+Aged+Paint: Cross Hatch.

The epoxy based primer was sprayed on the aged UV activated thermoplastic substrate and with the silane sealer according to the general application procedure. Cross hatch evaluation gave a rating of 4B.

TABLE 2

Real time aging of untreated and UV/Plasma treated of PEEK substrates at room temperature. Contact angle measurements and crosshatch adhesion test

| Surface Activation (test method) | Initial | 8 months aging |
|---|---|---|
| Untreated (contact angle, degrees) | 64 (3.9) | 64 (3.0 |
| Untreated (cross-hatch test) | 0B | 0B |
| Plasma (contact angle, degrees) | 13 (1.3) | 58 (3.0) |
| Plasma (cross-hatch test) | 4B | 1B |
| Plasma & sealant (crosshatch test | 4B | 4B |
| UV (contact angle, degrees) | 54 (5.4) | 66 (2.3) |

TABLE 2-continued

Real time aging of untreated and UV/Plasma treated of PEEK substrates at room temperature. Contact angle measurements and crosshatch adhesion test

| Surface Activation (test method) | Initial | 8 months aging |
|---|---|---|
| UV (cross-hatch test) | 0B | 0B |
| UV & sealant (cross-hatch test) | 4B | 4B |

The values in the parentheses are standard deviation values.
The chemical silane based sealer was immediately applied after UV or Plasma activation.
Painting occurred within two hours of activation for the initial sample and after 8 months for the aged samples. In other words, the painting was done after 8 months aging meaning that the substrate was not painted during the 8 months aging time As those skilled in the art will appreciate, numerous modifications and variations of the present disclosure are possible considering these teachings, and all such are contemplated hereby. All references cited herein are incorporated by reference herein, at least for their teachings in the context presented.

What is claimed:

1. A composite structure comprising a thermoplastic substrate having a chemical sealant directly bonded to a surface thereof by cross-polymer linkages derived from activated —OH, —SH, —C(O)H, —C(O)OH, or —C(O)—NH moieties of photolytically cleaved linkages of the thermoplastic substrate, cleaved at cleavage energy of 9 J/cm$^2$ to 300 J/cm$^2$ and at least one wavelength in a range of 10 nm-500 nm, and reactive groups of the chemical sealant, and a surfacing film layer; wherein the sealant is disposed between and is bonded to both the thermoplastic substrate and the surfacing film layer; the thermoplastic substrate including a plurality of layers of polymer composites containing oriented fibers; and the chemical sealant is chrome-free and comprises an organic or organometallic compound having one or more silanol, alkoxysilanol, or alkoxy silane moieties; and further comprises one or more of (i) one or more carboxy acid, carboxy ester, carboxy anhydride, amide, or lactam moieties; (ii) one or more hydroxyphosphate moieties; (iii) one or more isocyanate moieties; or (iv) one or more alkoxytitanate or alkoxyzirconate moieties.

2. The composite structure of claim 1, wherein the thermoplastic substrate comprises a polyphenylene sulfide (PPS), a polyphenylene oxide (PPO), or a polyetherimide (PEI), and wherein the plurality of layers comprises adjoining layers arranged such that the oriented fibers are transverse to one another.

3. The composite structure of claim 1, wherein the thermoplastic substrate comprises a thermoplastic polymer whose linkages are susceptible to at least partial photolytic cleavage upon irradiation by actinic radiation of sufficient intensity wherein the actinic radiation includes radiation with at least one wavelength in the range from about 10 nm to about 350 nm.

4. The composite structure of claim 1, wherein the thermoplastic substrate comprises a thermoplastic polymer whose linkages are susceptible to at least partial photolytic cleavage upon irradiation by at least one wavelength of actinic radiation at an energy in a range from about 10 J/cm$^2$ to about 300 J/cm$^2$ at the at least one wavelength.

5. The composite structure of claim 4, wherein the chemical sealant is directly bonded to a patterned portion of a surface of the thermoplastic substrate.

6. The composite structure of claim 1, wherein the chemical sealant further comprises one or more epoxy or oxetane moieties.

7. The composite structure of claim 1, wherein the chemical sealant further comprises one or more glycidyl ether moieties.

8. A composite structure comprising a thermoplastic substrate having a chemical sealant directly bonded to a surface thereof by cross-polymer linkages derived from activated —OH, —SH, —C(O)H, —C(O)OH, or —C(O)—NH moieties of ultraviolet photolytically cleaved linkages of the thermoplastic substrate and reactive groups of the chemical sealant, and a surfacing film layer; wherein the sealant is disposed between and is bonded to both the thermoplastic substrate and the surfacing film layer, and the thermoplastic substrate including a plurality of layers of polymer composites containing oriented fibers;

wherein the chemical sealant is chrome-free and comprises an organic or organometallic compound having one or more silanol, alkoxysilanol, or alkoxy silane moieties; and wherein the chemical sealant further comprises one or more carboxy acid, carboxy ester, carboxy anhydride, amide or lactam moieties.

9. A composite structure comprising a thermoplastic substrate having a chemical sealant directly bonded to a surface thereof by cross-polymer linkages derived from activated —OH, —SH, —C(O)H, —C(O)OH, or —C(O)—NH moieties of ultraviolet photolytically cleaved linkages of the thermoplastic substrate and reactive groups of the chemical sealant, and a surfacing film layer; wherein the sealant is disposed between and is bonded to both the thermoplastic substrate and the surfacing film layer, and the thermoplastic substrate including a plurality of layers of polymer composites containing oriented fibers;

wherein the chemical sealant is chrome-free and comprises an organic or organometallic compound having one or more silanol, alkoxysilanol, or alkoxy silane moieties; and wherein the chemical sealant further comprises one or more hydroxyphosphate moieties.

10. The composite structure of claim 1, wherein the chemical sealant further comprises one or more —OH, —SH, or —NH moieties.

11. A composite structure comprising a thermoplastic substrate having a chemical sealant directly bonded to a surface thereof by cross-polymer linkages derived from activated —OH, —SH, —C(O)H, —C(O)OH, or —C(O)—NH moieties of ultraviolet photolytically cleaved linkages of the thermoplastic substrate and reactive groups of the chemical sealant, and a surfacing film layer; wherein the sealant is disposed between and is bonded to both the thermoplastic substrate and the surfacing film layer, and the thermoplastic substrate including a plurality of layers of polymer composites containing oriented fibers;

wherein the chemical sealant is chrome-free and comprises an organic or organometallic compound having one or more silanol, alkoxysilanol, or alkoxy silane moieties; and wherein the chemical sealant further comprises one or more isocyanate moieties.

12. A composite structure comprising a thermoplastic substrate having a chemical sealant directly bonded to a surface thereof by cross-polymer linkages derived from activated —OH, —SH, —C(O)H, —C(O)OH, or —C(O)—NH moieties of ultraviolet photolytically cleaved linkages of the thermoplastic substrate and reactive groups of the chemical sealant, and a surfacing film layer; wherein the sealant is disposed between and is bonded to both the thermoplastic substrate and the surfacing film layer, and the thermoplastic substrate including a plurality of layers of polymer composites containing oriented fibers;

wherein the chemical sealant is chrome-free and comprises an organic or organometallic compound having one or more silanol, alkoxysilanol, or alkoxy silane moieties; and wherein the chemical sealant further comprises one or more alkoxytitanate or alkoxyzirconate moieties.

13. The composite structure of claim 1, further comprising an adhesive or paint layer.

14. The composite structure of claim 1, wherein the surfacing film layer comprises a thermoset(ting) polymer, the surfacing film layer having a first surface bonded to the chemical sealant and a second surface opposite the first surface and being a composite material comprising two or more of (a) a first peelable fabric, weave, mesh, or porous sheet disposed at or beneath the second surface; (b) at least one electrically conductive material, suitable to use in lightning strike protection, electric current dissipation, EMI shielding, or heat transfer applications; (c) at least one particulate filler or additive comprising a carbide, nitride, or oxide of aluminum, boron, silicon, tin, zirconium, or aluminum, carbon, copper, nickel, Sn—Zn, or stainless steel, or aramid; and (d) a UV resistant polymer or UV stabilizing additive.

15. The composite structure of claim 13, wherein the adhesive, paint, or surfacing film layer comprises a benzoxazine, a bismaleimide, a cyanoacrylate, an epoxy, an epoxy-acrylate, a (meth)acrylate, a (meth)acrylamide, a polyamide, a polyester, a polyimide, a polyurethane, a triazine, a vinyl ester, or a copolymer or mixture thereof.

16. The composite structure of claim 13, wherein the adhesive, paint, or surfacing film layer is applied but not yet cured or solidified.

17. The composite structure of claim 13, wherein the adhesive, paint, or surfacing film layer is cured or fully solidified.

18. The composite structure of claim 13, wherein the adhesive or paint is sufficiently bonded to the composite structure to exhibit a score at least a 3B for a 45° cross-hatched tape test according to ASTM D3359-09.

19. The composite structure of claim 13, wherein the surfacing film is present as an epoxy-based thermoset(ting) surfacing film.

20. The composite structure of claim 19 wherein the surfacing film is itself a solid-form composite material comprising one or more organic or inorganic fibers, fabrics, weaves, meshes, or porous sheets within the thermoplastic or thermoset(ting) polymer, and comprising one or more of:

(a) one or more peelable organic or inorganic fabrics, weaves, meshes, or porous sheets disposed at or beneath the second surface of the surfacing film;

(b) one or more organic or inorganic fabrics, weaves, meshes, or porous sheets contained within or at or beneath the second surface of the surfacing film, and further comprises at least one electrically conductive material, suitable to use in lightning strike protection, electric current dissipation, EMI shielding, or heat transfer applications; and/or (c) one or more particulate material suitable to use as an impact modifier.

21. The composite structure of claim 20, wherein the second surface of the surfacing film is coated with paint, comprising a chemical sealant disposed between the second surface of the surfacing film and the paint.

22. The composite structure of claim 1, wherein the chemical sealant is water-based.

23. An article of manufacture comprising the composite structure of claim 1.

* * * * *